United States Patent
Ahmed et al.

(10) Patent No.: US 12,494,137 B1
(45) Date of Patent: Dec. 9, 2025

(54) ENERGY-EFFICIENT PATH PLANNING SYSTEM AND METHOD FOR INTERNET OF DRONES USING REINFORCEMENT LEARNING

(71) Applicant: KING FAHD UNIVERSITY OF PETROLEUM AND MINERALS, Dhahran (SA)

(72) Inventors: Gamil Abdullah Mohsen Ahmed, Dhahran (SA); Zainab Saleh Mohammed Almania, Dammam (SA); Tarek Rahil Omar Sheltami, Dhahran (SA); Ashraf Sharif Hasan Mahmoud, Dhahran (SA); Abdulaziz Yagoub Mahmoud Barnawi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/177,320

(22) Filed: Apr. 11, 2025

(51) Int. Cl.
  *G08G 5/57* (2025.01)
  *G06N 3/006* (2023.01)
  *G06N 3/092* (2023.01)

(52) U.S. Cl.
  CPC .............. *G08G 5/57* (2025.01); *G06N 3/006* (2013.01); *G06N 3/092* (2023.01)

(58) Field of Classification Search
  None
  See application file for complete search history.

(56) References Cited

U.S. PATENT DOCUMENTS

| | | | |
|---|---|---|---|
| 10,387,813 B2 * | 8/2019 | Zhou | G06Q 10/063118 |
| 2019/0310644 A1 * | 10/2019 | Zhang | G01C 21/3453 |
| 2021/0103286 A1 * | 4/2021 | Wang | G05D 1/0214 |
| 2021/0287556 A1 * | 9/2021 | Hong | G08G 5/59 |
| 2021/0403159 A1 * | 12/2021 | Dey | G08G 5/55 |
| 2023/0239037 A1 * | 7/2023 | Zhang | H04B 7/18508 455/431 |
| 2025/0304110 A1 * | 10/2025 | Song | G06N 3/0475 |

FOREIGN PATENT DOCUMENTS

| | | |
|---|---|---|
| CN | 112327923 A | 2/2021 |
| CN | 118170013 A | 6/2024 |
| CN | 118311974 A | 7/2024 |

* cited by examiner

*Primary Examiner* — James J Lee
*Assistant Examiner* — Melanie G Huber
(74) *Attorney, Agent, or Firm* — Oblon, McClelland, Maier & Neustadt, L.L.P.

(57) ABSTRACT

A path planning system for an unmanned aerial vehicle in a network of unmanned aerial vehicles is disclosed. The system includes the unmanned aerial vehicles (UAVs). The system further includes a first processing circuitry configured with a particle swarm optimization component to offline generate paths for each of the UAVs by PSO to minimize path length and avoid static obstacles. The system further includes a second processing circuitry configured with a deep reinforcement learning (RL)-based planner component for each UAV, to perform real-time path planning to navigate the UAV through dynamic environmental conditions using a particular path generated by the PSO for the UAV as a consistent reference for the UAV. The system further includes a reward component to calculate a reward as part of the path planning by the deep RL-based planner component to determine potential paths and converge to an optimal path for the UAV.

16 Claims, 20 Drawing Sheets

ENERGY-EFFICIENT PATH PLANNING SYSTEM AND METHOD FOR INTERNET OF DRONES USING REINFORCEMENT LEARNING

STATEMENT REGARDING PRIOR DISCLOSURE BY THE INVENTORS

Aspects of this technology are described in an article AlMania, Zainab, Tarek Sheltami, Gamil Ahmed, Ashraf Mahmoud, and Abdulaziz Barnawi. 2024. "Energy-Efficient Online Path Planning for Internet of Drones Using Reinforcement Learning" *Journal of Sensor and Actuator Networks* 13, no. 5:50. The article is herein incorporated by reference in its entirety.

STATEMENT OF ACKNOWLEDGEMENT

The support provided by the interdisciplinary center of smart mobility and logistics at King Fahd University of Petroleum and Minerals (Grant number [INML2400]) is gratefully acknowledged.

BACKGROUND

Technical Field

The present disclosure is directed to unmanned aerial vehicle (UAV) path planning, and more particularly, to an energy-efficient path planning system and method for Internet of drones (UAVs) using reinforcement learning.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Unmanned aerial vehicles (UAVs), commonly known as drones, have gained significant growth across various domains, including surveillance, agriculture, disaster response, and military applications. Their obstacles, minimizing energy consumption, and ensuring mission success. ability to fly autonomously or semi-autonomously enables efficient data collection, real-time monitoring, and precise operations. A critical aspect of UAV functionality is path planning, which determines an optimal trajectory to reach a destination while avoiding Efficient path planning is essential for the UAVs to operate reliably in complex and dynamic environments, where real-time adaptability and decision-making play a crucial role.

Conventional UAV path planning methodologies include graph-based methods, sampling-based techniques, and heuristic optimization algorithms. These methodologies have been widely used to calculate feasible paths for the UAVs, but they exhibit several limitations in dynamic and unpredictable environments. The graph-based methods, such as Dijkstra's algorithm and A* algorithm, rely on weighted graphs to determine the shortest path from a source to a destination. These methods offer optimal solutions in static environments but become computationally expensive when dealing with dynamically changing obstacles or real-time scenarios. Moreover, a need for continuous re-computation makes them inefficient for real-time UAV navigation, limiting their applicability in mission-critical operations.

The sampling-based techniques, including rapidly-exploring random tree (RRT) and probabilistic roadmaps (PRM), generate random samples in a configuration space to construct feasible paths. While these techniques provide effective solutions for complex environments, they suffer from inefficiencies in cluttered spaces due to redundant sampling. Moreover, their adaptability to dynamic obstacles is limited, requiring re-planning whenever the environment changes significantly.

The heuristic optimization algorithms, such as genetic algorithm (GA) and particle swarm optimization (PSO), leverage evolutionary and swarm intelligence principles to optimize UAV paths. These metaheuristic approaches provide flexibility in handling complex path-planning scenarios but come with high computational overhead. Moreover, an iterative nature of these algorithms makes them computationally expensive, especially for real-time applications. Furthermore, they are prone to local optima, which can lead to suboptimal flight paths, reducing overall efficiency in navigation. Each of the aforementioned methodologies suffers from several limitations that hinder their broader adoption in UAV path planning systems.

Accordingly, it is one object of the present disclosure to provide methods and systems for enhancing UAV path planning to ensure efficient navigation, obstacle avoidance, and real-time decision-making in dynamic environments. It is a further object of the present disclosure to provide a framework for multi-UAV path planning in a 3-D dynamic environment.

SUMMARY

In an exemplary embodiment, a path planning system for an unmanned aerial vehicle in a network of unmanned aerial vehicles is disclosed. The system includes a plurality of the unmanned aerial vehicles (UAVs). The system further includes a first processing circuitry configured with a particle swarm optimization component configured to generate paths offline for each of the UAVs by particle swarm optimization (PSO) to minimize path length and avoid static obstacles. The system further includes a second processing circuitry configured with, for each UAV of the plurality of UAVs, a deep reinforcement learning (RL)-based planner component configured to perform real-time path planning to navigate the UAV through dynamic environmental conditions using a particular path generated by the PSO for the UAV as a consistent reference for the UAV. The system further includes a reward component to calculate a reward as part of the path planning by the deep RL-based planner component to determine potential paths and converging to an optimal path for the UAV.

In another exemplary embodiment, a path planning method for a plurality of unmanned aerial vehicles (UAVs). The method includes generating, offline by particle swarm optimization (PSO) on first processing circuitry, paths for each of the UAVs to minimize path length and avoid static obstacles. The method further includes for each of the plurality of UAVs, performing, by a deep reinforcement learning (RL)-based planner component on second processing circuitry, real-time path planning to navigate the UAV through dynamic environmental conditions using a particular path generated by the PSO for the UAV as a consistent reference for the UAV. The method further includes calculating a reward to determine potential paths and converging to an optimal path for the UAV in the deep RL-based planner component.

In yet another exemplary embodiment, a non-transitory computer-readable storage medium including computer executable instructions, wherein the instructions, when executed by a computer, cause the computer to perform a method for path planning for a plurality of unmanned aerial vehicles (UAVs). The method includes generating, offline by particle swarm optimization (PSO), paths for each of the UAVs to minimize path length and avoid static obstacles. The method further includes for each of the plurality of UAVs, performing, by a deep reinforcement learning (RL)-based planner component, real-time path planning to navigate the UAV through dynamic environmental conditions using a particular path generated by the PSO for the UAV as a consistent reference for the UAV. The method further includes calculating a reward to determine potential paths and converging to an optimal path for the UAV in the deep RL-based planner component.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
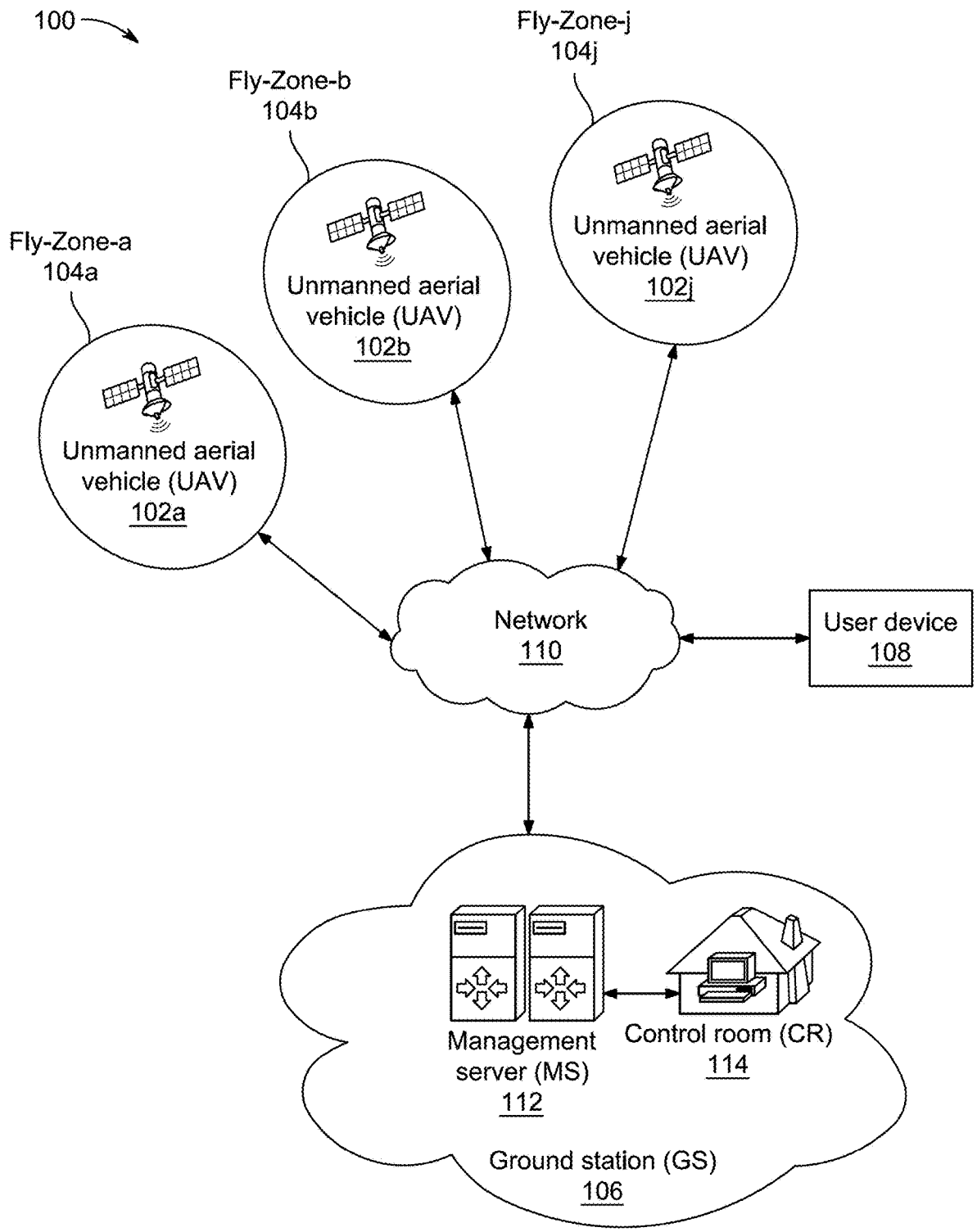
FIG. 1 illustrates an architecture of Internet of Drones (IoD) network system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system and a method for multi-unmanned aerial vehicle (UAV) path planning in dynamic three-dimensional (3D) environments, utilizing improved particle swarm optimization (IPSO) and reinforcement learning (RL) to provide an energy-efficient and dynamic navigation solution. Conventional UAV path planning approaches often rely on heuristic algorithms or static precomputed routes, which are ineffective in dynamic environments with unexpected obstacles and evolving flight conditions. These approaches lack the ability to optimize paths in real-time, leading to inefficient navigation, increased energy consumption, and a higher risk of collisions.

The present disclosure combines the IPSO with the RL to enable UAVs to dynamically adjust corresponding flight paths in response to changes in the environment. The IPSO initially optimizes swarm-based path exploration to minimize energy consumption for multiple UAVs, while the RL continuously learns and refines flight strategies in the changing environment to accommodate obstacle avoidance. The integration of the IPSO and the RL allows the UAVs to generate adaptive and collision-free paths in real-time, ensuring safe and energy efficient navigation. Unlike traditional approaches that rely on predefined routes or reactive collision avoidance, the present disclosure proactively optimizes UAV trajectories in real-time based on environmental feedback, leading to more sustainable and autonomous UAV operations.

FIG. 1 illustrates an architecture of Internet of Drones (IoD) network system 100, according to certain embodiments. The IoD network system 100 is a large-scale system that facilitates communication among multiple aerial vehicles (UAVs) 102a-102j (hereinafter collectively referred to as the UAVs 102 and individually referred to as the UAV 102) into a global or a regional network using networked communication systems, such as cellular networks (fourth generation (4G) network/fifth generation (5G) network), internet-based wireless communication, and other wireless communication technologies. Embodiments of the present disclosure are intended to include or otherwise cover any network communication systems, including known related art and/or later developed technologies.

The IoD network system 100 includes the UAVs 102 operating in corresponding fly-zones 104a-104j (hereinafter collectively referred to as the fly-zones 104 and individually referred to as the fly-zone 104), a ground station (GS) 106, and a user device 108. In an embodiment, the UAVs 102, the GS 106, and the user device 108 may be communicated to each other through a network 110. In addition, UAVs 102 can communicate with each other through wireless communication, such as WiFi. Further, in an embodiment, the GS 106 includes a management server (MS) 112 and a control room (CR) 114.

According to an embodiment, the network 110 may be a data network such as, but not limited to, the Internet, a local area network (LAN), a wide area network (WAN), a metropolitan area network (MAN), and so forth. In an exemplary embodiment, the Internet may facilitate communication between the user device 108 and the GS 106, enabling remote monitoring and control of UAV operations. Embodiments of the present disclosure are intended to include or otherwise cover any type of the data network, including known, related art, and/or later developed technologies.

In some embodiments, the network 110 may incorporate a wired network such as, but not limited to, an Ethernet-based connection, a fiber-optic communication, which connects a cellular network infrastructure to the MS 112, ensuring secure and high-speed data transmission. As used herein, the term "cellular network infrastructure" refers to physical and logical components that enable mobile communication, such as 4G and 5G networks.

In some embodiments, the network 110 may include a wireless network such as, but not limited to, a cellular network (5G), which enables wireless connectivity between the UAVs 102 and the MS 112, ensuring low-latency communication and high data transfer rates for remote operations. Embodiments of the present disclosure are intended to include or otherwise cover any type of wired or wireless network, including known, related art, and/or later developed technologies.

Each UAV 102 in the IoD network system 100 operates within the corresponding fly-zone 104, which ensures safe and regulated airspace usage. In an embodiment, the UAVs 102 can be equipped with sensors (e.g., light detection and ranging (LiDAR), infrared sensors, ultrasonic sensors, accelerometers, gyroscopes, barometers, magnetometers, and global positioning system (GPS) receivers), navigation systems (e.g., inertial navigation system (INS), global navigation satellite system (GNSS), simultaneous localization and mapping (SLAM), visual odometry (VO), and real-time kinematic (RTK) positioning), and communication modules (e.g., 5G cellular network, wireless fidelity (Wi-Fi), satellite communication) that allow the UAVs 102 to interact with each other and the GS 106. In an exemplary embodiment, the UAVs 102 may communicate with each other through a wireless mesh network, enabling cooperative flight operations (e.g., formation flying, search and rescue missions, environmental monitoring), swarm intelligence, and autonomous navigation. As used herein, the term "swarm intelligence" refers to a collective behavior of decentralized, self-organized UAVs 102 that work together to accomplish tasks efficiently. In another exemplary embodiment, the UAVs 102 may establish a wireless connection with the GS 106 through the wireless network.

The GS 106 acts as a central hub for airspace control and UAV coordination. As discussed, the GS 106 includes the MS 112, which acts as an intermediary between the UAVs 102 and the GS 106. The MS 112 can be configured to process incoming flight data (e.g., position and navigation data, sensor and environmental data, communication and network data), assigns missions (e.g., surveillance, package delivery, disaster response, agricultural monitoring, infrastructure inspection) to the UAVs 102, and ensures collision-free flight paths. In an embodiment, the MS 112 may be, but not limited to, cloud-based servers, edge computing servers, on-premises servers, 5G multi-access edge computing servers, and other distributed computing devices. Embodiments of the present disclosure are intended to include or otherwise cover any type of the MS 112, including known related art and/or later developed technologies.

The CR 114 can include a human interface for monitoring and managing the UAV operations. The CR 114 can include workstations, monitoring screens, and communication interfaces that allow operators 116 to analyze UAV telemetry (e.g., GPS coordinates, altitude, speed, battery status, sensor readings, heading, and environmental conditions), mission status (e.g., pre-flight status, takeoff status, mission execution status, and so forth), and environmental conditions. The CR 114 enables the operators 116 to intervene when necessary, providing manual overrides for the UAV operations, adjusting flight paths in response to unexpected obstacles, or reassigning the missions dynamically. In an embodiment, the CR 114 integrates data from the multiple UAVs 102, providing a centralized view of an entire UAV fleet and facilitating coordinated operations. In an embodiment, the MS 112 and CR 114 are interconnected through the network 110, ensuring reliable data exchange and uninterrupted UAV operations.

The user device 108 can be connected to the GS 106 through the network 110, allowing remote monitoring and control of the UAV missions. In an embodiment, the user device 108 enables the operators 116 to access real-time UAV telemetry, the mission status, and navigation controls (i.e., manual navigation controls, autonomous navigation controls, sensor-based navigation controls) through a user interface. The remote accessibility enhances operational flexibility, enabling the operators 116 to deploy, track, and manage the UAVs 102 from any location. The user device 108 can be, for example, but not limited to, a mobile device, a portable computer, a laptop, a tablet, a desktop, a smartphone, and other smart display device. Embodiments of the present disclosure are intended to include or otherwise cover any type of the user device 108, including known, related art, and/or later developed technologies.

Figure 2A:
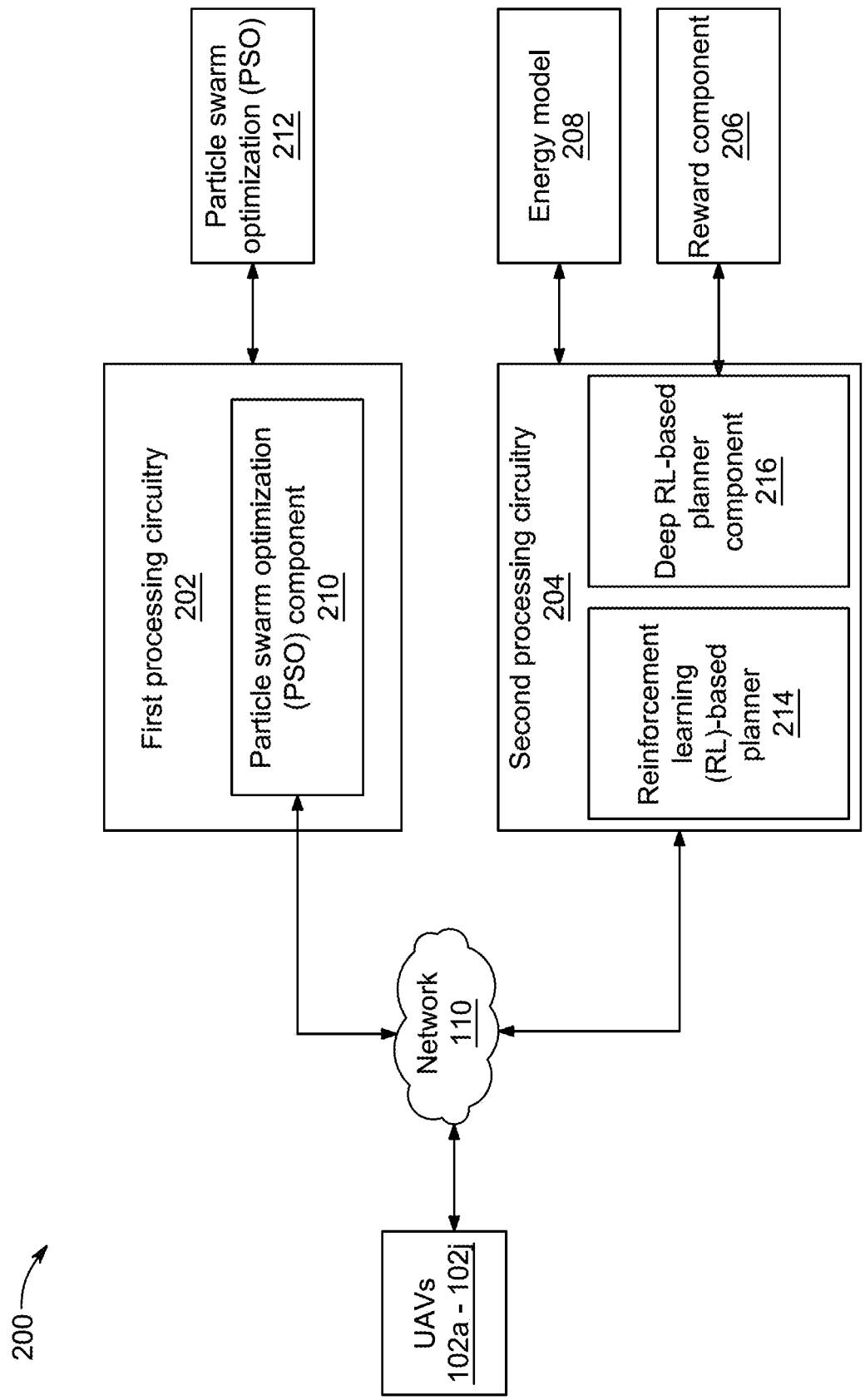
FIG. 2A illustrates a block diagram of a path planning system for an unmanned aerial vehicle (UAV), according to certain embodiments.

FIG. 2A illustrates a block diagram of a path planning system 200 for the UAV 102, according to certain embodiments. The path planning system 200 is configured to generate optimal and collision-free flight paths for the UAVs 102, dynamically adjust routes based on real-time environmental data, and ensure efficient, safe, and geofencing-compliant navigation for mission execution. The path planning system 200 includes the UAVs 102, a first processing circuitry 202, a second processing circuitry 204, a reward component 206, and an energy model 208. In an embodiment, the UAVs 102, the first processing circuitry 202 and the second processing circuitry 204 are connected to each other through the network 110.

In some aspects, the UAVs 102 (i.e., drones) are aircraft that operate without a human pilot onboard. In an embodiment, the UAVs 102 are remotely controlled by the operator 116. In another embodiment, the UAVs 102 are autonomously navigated based on pre-programmed flight paths and real-time sensor data. The UAVs 102 can be of any type, such as, but not limited to, fixed wing UAVs, rotary-wing UAVs, hybrid UAVs, nano and micro-UAVs, high-altitude long-endurance (HALE) UAVs, and so forth. Embodiments of the present disclosure are intended to include or otherwise cover any type of the UAVs 102, including known related art and/or later developed technologies.

In an embodiment, the first processing circuitry 202 and the second processing circuitry 204 are located in the CR 114 (as shown in FIG. 1) at the GS 106 (as shown in FIG. 1). In another embodiment, the first processing circuitry 202 is located in the CR 114 at the GS 106 to generate optimized paths before deployment of the UAV 102, while the second processing circuitry 204 is embedded within each UAV 102 for performing real-time path planning for dynamic obstacles (e.g., other UAVs, birds, aircraft, helicopters, weather phenomena, kites, balloons). In an embodiment, the first processing circuitry 202 is deployed on an edge computing infrastructure, such as the 5G MEC server near an operating area (e.g., mobile base station) of the UAV 102, and the second processing circuitry 204 is partially located on the edge computing infrastructure and partially onboard the UAV 102. In other words, functional components of the second processing circuitry 204 are is split between two locations. For example, some components may reside in the edge computing unit (e.g., at GS 106), while others reside onboard the UAV 102 to handle real-time decision-making. In yet another embodiment, the first processing circuitry 202 is located on a cloud server to enable global path planning for the multiple UAVs, while the second processing circuitry 204 may be embedded within each corresponding UAV 102.

The first processing circuitry 202 can be configured to execute a first set of computer-executable instructions stored in a non-transitory computer-readable medium to perform operations associated with the path planning system 200. The first set of computer-executable instructions refers to a program logic executed by the first processing circuitry 202 to implement offline path planning using particle swarm optimization (PSO) 212. The first set of computer-executable instructions can include initialization, fitness evaluation, position updating, and iterative optimization processes to generate optimal flight paths while avoiding static obstacles. The first processing circuitry 202 can be, but not limited to, a programmable logic control unit (PLC), a microcontroller, a microprocessor, a computing device, a development board, a computer, and so forth. Embodiments of the present disclosure are intended to include or otherwise cover any type of the first processing circuitry 202, including known, related art, and/or later developed technologies.

The first processing circuitry 202 is configured with a PSO component 210. The PSO component 210 is configured to generate offline paths for each of the UAVs 102 by using the PSO 212 to minimize path length and avoid the static obstacles (e.g., buildings, mountains, hills, bridges, skylines and overpasses, wind turbines). In an embodiment, the PSO 212 is an improved PSO (IPSO) (hereinafter PSO 212 is referred to as IPSO 212, which incorporates improvements and revisions to a conventional PSO algorithm) that is applied offline in static environments. The static environments can be, but not limited to, urban landscapes (i.e., buildings, tunnels, bridges), industrial zones (i.e., factories, warehouses), mountainous regions (cliffs, hills, valleys), and other stationary structures.

Figure 2B:
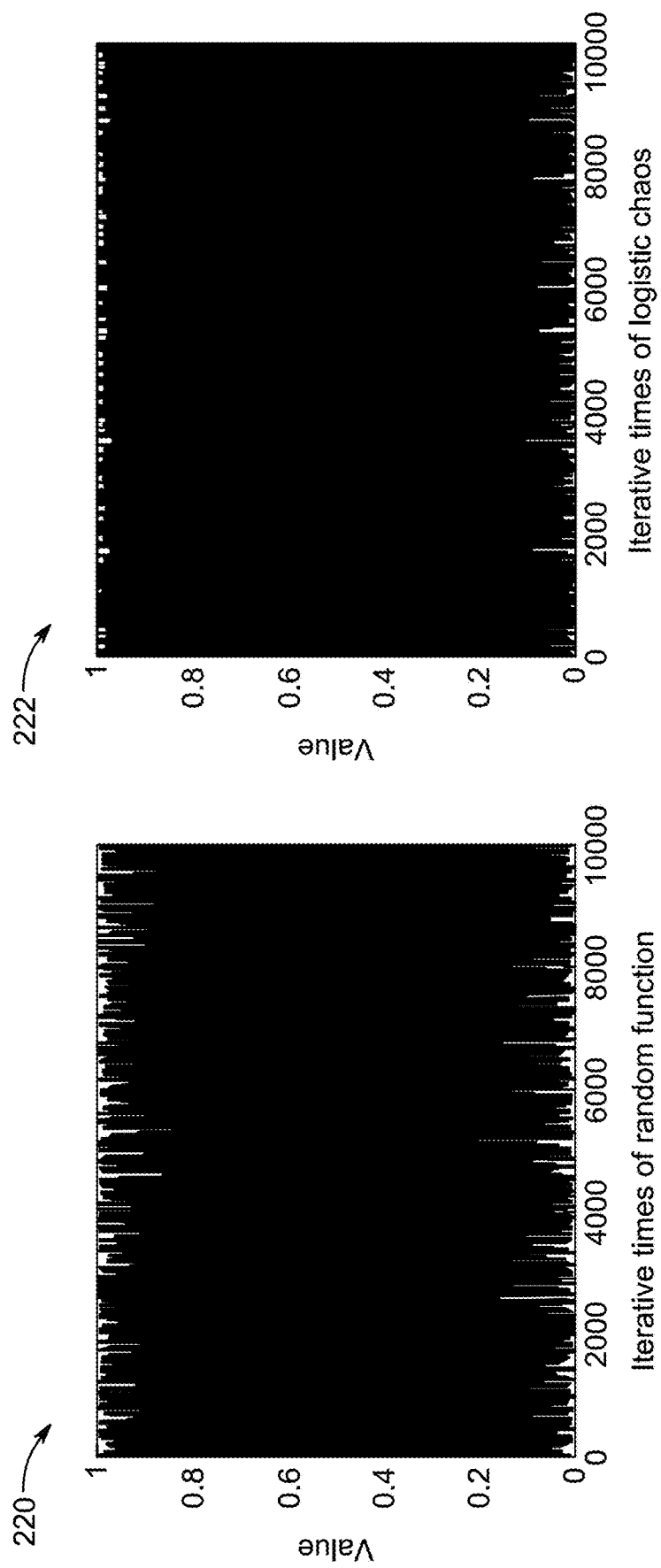
FIG. 2B illustrates a graphical analysis of a random function map and a logistic map, according to certain embodiments.

In an embodiment, the PSO component 210 is configured to generate paths offline by starting with an initialization phase, where the start and end coordinates of each UAV 102 are defined. During the initialization phase, an initial distribution of particles (paths) is generated within a search space. As used herein, the term "particles" refers to individual solutions (a potential UAV trajectory) in the search space, each representing a potential solution to an optimization problem. Also, as used herein, the term "search space" refers to a set of all possible solutions that the IPSO 212 explores to find an optimal or near-optimal solution. For example, in the case of UAV path planning, the search space represents possible trajectories that the UAV 102 may take from its starting position to its destination while considering constraints such as stationary obstacles, terrain, and flight regulations in the static environment. To improve the initial distribution of the particles in the search space, various initialization methods, such as but not limited to random initialization, clustered initialization, grid-based initialization, and other parameter initialization methods, can be employed in the IPSO 212. In a preferred embodiment, the IPSO 212 is configured with an initialization stage in which chaos-based particles utilize a logistic map 222 (as shown in FIG. 2B) (i.e., a mathematical function used to describe chaotic behavior in dynamic systems) to obtain an initialization formation. As used herein, the term "chaos-based particles" refers to an initialization method that uses chaotic sequences or maps, such as the logistic map 222 or other chaotic functions, to generate initial positions for the particles (i.e., initial paths) in the search space. The logistic map 222 may be expressed using equation (1).

$$X_{n+1} = f(\mu X_n) = \mu X_n (1 - X_n), \quad (1)$$

where n is an iteration number, X represents a chaos variable, u is a predetermined constant (a bifurcation coefficient), and f is a nonlinear function that describes how $X_n$ evolves over iterations. The logistic map 222 assists in creating a more uniform distribution of the particles, leading to better convergence speed (i.e., a rate at which the IPSO 212 approaches the optimal or near-optimal solution over successive iterations) and improved quality of solutions by providing a broader spectrum of potential flight paths.

Upon initialization (i.e., once the initial paths are generated), each generated path undergoes a fitness evaluation to determine the quality and suitability of the generated paths for an optimal trajectory of the UAV 102. In an embodiment, a fitness function evaluates each generated path based on factors, such as, but not limited to, the path length (where shorter paths for favored to minimize travel time and energy consumption), obstacle avoidance (which assigns penalties to the paths that intersect with the static obstacles, ensuring safer navigation), smoothness (assessed by analyzing abrupt directional changes in the path, as smoother trajectories lead to better energy efficiency). For example, in a mountainous region, the fitness function prioritizes the paths that avoid cliffs, while in an urban setting, the fitness function favors the paths that avoid tunnels and buildings. By incorporating the factors, the fitness function guides the IPSO 212 towards refining and selecting the most efficient and feasible UAV trajectories, balancing safety, efficiency, and energy optimization.

Further, the IPSO 212 is configured to adjust a mutation rate using an adaptive mutation strategy to optimize the balance between exploration (diversity) and exploitation (convergence). As used herein, the term "exploration" refers to a process of searching for new, diverse solutions across a wide search space. The process helps in discovering potentially better solutions and avoiding local optima. In the case of the UAV path planning, the exploration ensures that a variety of possible paths are considered. Also, as used herein, the term "exploitation" refers to a process of refining and improving upon already known good solutions. The process focuses on converging toward an optimal solution based on prior knowledge. In the case of the UAV path planning, the exploitation ensures that a best-found trajectory is further optimized for efficiency and safety.

The adaptive mutation strategy can be, but not limited to, a time-dependent strategy, a velocity-based strategy, a random-based strategy, and other mutation functions. In a preferred embodiment, the adaptive mutation strategy is a fitness-based strategy, where the mutation rate is adjusted dynamically based on the particle's fitness values. In an embodiment, the particles with lower fitness values (i.e., farther from optimal solutions) undergo higher mutation rates, enabling the exploration of new regions. In another embodiment, the particles with higher fitness values (i.e., closer to the optimal solution) undergo lower mutation rates, facilitating refined convergence toward the optimal solution. The fitness-based strategy helps the IPSO 212 maintain an effective balance between exploring diverse areas initially and exploiting candidate solutions (that may show optimal or near-optimal performance) as the optimization progresses.

In an embodiment, the adaptive mutation strategy utilizes equation (2) to adjust the mutation rate.

$$x(1+t) = x(t) + \epsilon v(1+t), \quad (2)$$

where t is a current simulation time, v represents particle's velocity, e is a scaling factor that controls a magnitude of a velocity, x(t) represents a position of the particle at time t and x(1+t) represents the position of the particle at a next time step or iteration (t+1). A high value of $\epsilon$ enables rapid search space exploration, but this may lead to less refined optimization. On the other hand, a low value of e promotes the exploitation and fine-tuning of the solution, but it may result in less exploration. To ensure an effective balance between the exploration and the exploitation, e is dynamically adjusted over time using equation (3):

$$\varepsilon = \varepsilon_{max} - \frac{(\varepsilon_{max} - \varepsilon_{min}) * t}{Maxlt}, \quad (3)$$

where $\epsilon_{max} \leq \epsilon_{min}$ and $\epsilon_{max}$ and $\epsilon_{min}$ are constant values that represent upper and lower bounds for the mutation rate. Further, t and MaxIt represent a current time and a total simulation time, respectively. As t increases, indicating more iterations, $\epsilon$ decreases, which enables the particles to reduce their exploration and focus more on refining their solutions, aiding in convergence toward an optimal path. This dynamic adjustment of the mutation rate helps balance the exploration (during the early stages) and the exploitation (during the later stages of the optimization process).

To further enhance the exploitation process, the IPSO 212 uses additional parameters, such as acceleration coefficients and inertia weight ($\omega$), for controlling the movement and the velocity of the particles during the optimization process.

In an embodiment, the IPSO 212 uses two acceleration coefficients, c1, and c2, indicating weights of a stochastic acceleration. As used herein, the term "stochastic acceleration" refers to an influence of random factors in guiding the particles (or potential solutions) within the IPSO 212. The acceleration coefficients c1 and c2 guide the particles (or potential solutions) through the search space during the optimization process. The acceleration coefficients c1 and c2 represent the influence of a particle's own best-known position (pBest) and a global best-known position (gBest) on the velocity and the movement of the particle in the IPSO 212. In other words, c1 controls how much the particle is influenced by the particle's own best-known position (pBest) and c2 controls how much the particle is influenced by the global best-known position (gBest). By multiplying the acceleration coefficients c1 and c2 with random vectors r1 and r2 (generated for each particle in each iteration), the acceleration coefficients c1 and c2 introduce controllable stochastic effects (i.e., random variations or changes that influence the movement of particles in the IPSO 212). The random vectors r1 and r2 determine the extent to which the particles are attracted to their own best solution (pBest) and the global best-known solution (gBest), respectively, ensuring variability in the movement of the particles across the search space and facilitating both the exploration and the exploitation. In an exemplary embodiment, the acceleration coefficients c1 and c2 represent the weights assigned to information shared between the particles, guiding the movement of the particles through the search space.

For instance, if c1=c2=0, the particle solely relies on its own knowledge, considering only previous velocity and best position (pBest) to determine a next position. In another embodiment, if c1>c2, the particles gravitate towards local attractors, or pBest, focusing on refining a current best solution found by an individual particle. This enables the exploitation, focusing the search around areas that have already yielded good results. For example, a condition of c1>c2 is useful when the UAV 102 is close to the destination, and fine-tuning the path is required. In yet another embodiment, if c2>c1, the particles lean towards a global attractor (gBest), thus enabling the exploration of broader regions within the search space, which can help the UAV 102 explore more efficient paths or the paths that minimize energy usage over the entire trajectory.

The balance between c1 and c2 determines a trade-off between the exploration and the exploitation. For example, in initial stages of an optimization task, where the solution space is not fully explored, a higher value of c2 (greater than c1) guides the IPSO 212 to explore new areas and avoid premature convergence (i.e., falling into suboptimal solutions too quickly). As the particles converge towards promising regions (i.e., areas with high potential for optimal solutions), adjusting the coefficients to have c1>c2 encourages the exploitation, allowing the particles to fine-tune their positions for more accurate solutions.

The inertia weight ($\omega$) is a parameter that controls the influence of the previous velocity of the particle on the current velocity of the particle. The inertia weight ($\omega$) balances the exploration and the exploitation by allowing the particles to maintain the exploration in the early stages and refining the solutions (exploitation) in the later stages. The inertia weight ($\omega$) may be decreased over time to ensure convergence as the optimization progresses. In an exemplary embodiment, a large value of the inertia weight ($\omega$) promotes the exploration by enabling the IPSO 212 to explore a wider space, while a small value of the inertia weight ($\omega$) enables the exploitation by focusing on the promising regions. In an embodiment, the inertia weight ($\omega$) is adapted linearly, as shown in equation (4).

$$\omega(t) = -\omega_{max} \frac{(MaxIt - t)}{MaxIt} + \omega_{min}, \qquad (4)$$

where t represents the current time, while MaxIt is a higher simulation time. $\omega_{max}$ and $\omega_{min}$ correspond to maximum and minimum values of the inertia weight ($\omega$). By utilizing the linear adaptation, the value of the inertia weight ($\omega$) changes dynamically over time, gradually transitioning from $\omega_{max}$ to $\omega_{min}$ as the simulation progresses. This adaptive approach allows the IPSO 212 to balance the exploitation and the exploration throughout the optimization process.

In an embodiment, the IPSO 212 is configured to improve search efficiency by replacing inactive particles with fresh particles. As used herein, the term "inactive particles" refers to particles that have not contributed effectively to the search process or have failed to discover better solutions. The inactive particles occur when the particles lose the ability to search globally or even locally, such as when they fail to discover a better position, leading to premature convergence. The replacement of the inactive particles may maintain diversity in the swarm and prevent the swarm from getting stuck in the local optima (a solution that is better than neighboring solutions within a limited region of the search space but is not necessarily the best overall solution), thus improving chances of reaching global optimum (i.e., a best possible solution across the entire search space). As discussed previously, the adaptive adjustment of ε and $\omega_{max}$ occurs at each iteration to guide the search dynamics of the IPSO 212. After each iteration, a trail of each particle is evaluated. If the trail of the particle exceeds a predefined threshold, indicating inactivity or stagnation, the particle is replaced with a new particle. The "trail of each particle" refers to a particle's history or path through the search space over time. This includes the particle's previous positions and movements during the optimization process. In an embodiment, a refresh mechanism ensures that the optimization process continues to explore the search space effectively, preventing the IPSO 212 from getting stuck in suboptimal regions. The IPSO 212 repeats a process until the optimal solution is found or a time limit is reached. In an embodiment, a final path, which is the one with a best fitness score, is selected as the optimal trajectory for the UAV 102, and the final path is used for generation of the UAV's flight route in a static environment.

The second processing circuitry 204 is configured to execute a second set of computer-executable instructions stored in the non-transitory computer-readable medium to perform operations associated with the path planning system 200. The second set of computer-executable instructions refers to a program logic executed by the second processing circuitry 204 to implement the real-time path planning using a reinforcement learning (RL)-based planner 214. The RL-based planner 214 may be employed with a reinforcement learning model that predicts future states (e.g., anticipated obstacle positions, estimated wind drift, expected UAV battery consumption) based on sensor data (e.g., real-time obstacle locations from the LiDAR, GPS position data) and adjusts UAV's movement accordingly to ensure an optimal navigation. In an exemplary embodiment, the RL-based planner 214 is configured to refine its decision-making through real-time interaction with the dynamic environment, learning from previous experiences to improve future path selections. In an embodiment, by using deep learning techniques, the RL-based planner 214 efficiently captures complex spatial relationships and dynamic constraints (i.e., wind speed variations, temporary no-fly zones, moving obstacles like birds or other UAVs), enabling the UAV 102 to react to the unexpected obstacles and maintain an efficient and collision-free trajectory. As used herein, the term "spatial relationships" refers to intricate geometric and topological interactions between the UAV 102, the obstacles, and the environment. For example, in the urban setting, the UAV 102 navigating between high-rise buildings should consider narrow corridors, varying altitudes, and GPS signal occlusions to determine the optimal flight path.

The reinforcement learning model can be, but is not limited to, a deep Q-network (DQN), a proximal policy optimization (PPO), a deep deterministic policy gradient (DDPG), a trust region policy optimization (TRPO), a multi-agent deep deterministic policy gradient (MADDPG), and other deep reinforcement learning algorithms. In a preferred embodiment, the reinforcement learning model is a Q-learning model. In other words, the RL-based planner 214 of the second processing circuitry 204 is the Q-learning model. In another preferred embodiment, the reinforcement learning model is a actor-critic reinforcement learning model. In other words, the RL-based planner 214 of the second processing circuitry 204 is the actor-critic reinforcement learning model.

The second set of computer-executable instructions includes dynamic obstacle avoidance, real-time trajectory adjustments, reward computation, and policy updates to navigate the UAV 102 through changing environmental conditions while using the offline IPSO-generated path as a reference. The second processing circuitry 204 can be, but not limited to, a programmable logic control unit (PLC), a microcontroller, a microprocessor, a computing device, a development board, a computer, and so forth. Embodiments of the present disclosure are intended to include or otherwise cover any type of the second processing circuitry 204, including known, related art, and/or later developed technologies.

The second processing circuitry 204 is configured with a deep RL (DRL)-based planner component 216. In an embodiment, the DRL-based planner component 216 is the actor-critic reinforcement learning model. The DRL-based planner component 216 is configured to perform the real-time path planning to navigate the UAV 102 through dynamic environmental conditions. The DRL-based planner component 216 is using a particular path generated by the IPSO 212 as a consistent reference for the UAV 102. The dynamic environmental conditions can be, but not limited to, moving obstacles (e.g., other UAVs, birds, vehicles moving within UAV's path), uncertain terrain changes (e.g., variations in ground elevation or obstacles appearing dynamically, such as trees swaying in the wind), changing weather (e.g., rain, fog, temperature fluctuations), varying wind conditions, and so forth. Embodiments of the present disclosure are intended to include or otherwise cover any type of the dynamic environmental conditions.

In an exemplary embodiment, the DRL-based planner component 216 performs the real-time path planning by continuously analyzing UAV's environment and dynamically adjusting the trajectory of the UAV 102 to avoid the moving obstacles and optimize the path of the UAV 102. The DRL-based planner component 216 may be configured to initialize the real-time path planning by receiving the initial path generated by the IPSO 212, which serves as the reference trajectory. As the UAV 102 moves, the DRL-based planner component 216 can be configured to continuously collect the sensor data, such as, but not limited to, obstacle positions, wind variations, and other environmental factors, to assess changes in surroundings. In an embodiment, the sensor data is obtained from sensors mounted in the UAV 102 to ensure optimal data acquisition for navigation and obstacle avoidance. The sensors can be, but not limited to, the ultrasonic sensor, the LiDAR, the GPS, radar and other object and location detection sensors.

The Q-learning model enables the UAV 102 (i.e., agent) to learn optimal decision-making policies by interacting with the dynamic environment and maximizing cumulative rewards. As used herein, the term "optimal decision-making policies" refers to a strategy or mapping from states to actions that maximizes the cumulative reward over time. The optimal decision-making policies define a best possible sequence of actions that the UAV 102 should take in a given environment to achieve a highest long-term return. Also, as used herein, the term "cumulative reward" refers to a cumulative sum of rewards, that the UAV 102 receives over time as the UAV 102 interacts with the dynamic environment.

In an embodiment, the Q-learning model is a model-free and off-policy RL method, meaning that the Q-learning model does not require prior knowledge of environment's dynamics and can learn independently of a policy being followed. In an embodiment, Q-learning's agent is a value-based agent that is trained to estimate future rewards (cumulative rewards) during a learning process. In an exemplary embodiment, the UAV 102 selects the action for which a greatest reward is obtained by utilizing a Q-value. As used herein, the term "Q-value" represents an expected cumulative reward, that the UAV 102 may receive if the UAV 102 takes a particular action in a given state and then follows an optimal policy thereafter.

In an embodiment, the Q-value is maintained in a Q-table, where rows correspond to the states and columns correspond to the actions. Initially, all Q-values are either random or set to zero. The Q-values are then updated iteratively using a Bellman equation, which defines a recursive relationship between a current Q-value, an immediate reward, and a maximum future Q-value. In an embodiment, the UAV 102 learns an optimal action-selection policy by continuously refining the Q-values and selecting the action with a highest Q-value for the given state. For instance, in an autonomous drone navigation scenario, if the UAV 102 is navigating through a cluttered environment, the Q-value for moving forward will be high if the path is clear, whereas the Q-value for turning left will be lower if the obstacle is detected.

In an embodiment, the Q-learning model uses a Markov Decision Process (MDP) framework for sequential decision-making in the RL. The MDP provides a mathematical structure to represent an RL problem using states, actions, transition probabilities, and rewards. The MDP captures the interaction between the UAV 102 and the corresponding environment over several time steps. In an exemplary embodiment, at each time step, the UAV 102 observes a current state(S) of the environment and takes an action (A) based on the observation. As a result of the action (A), the environment provides the UAV 102 with a numerical reward (R), which serves as feedback for decision-making. Since real-world environments are often probabilistic, a transition to a next state and the corresponding reward are not deterministic but instead follow a probability distribution. In an embodiment, the MDP includes various components such as the state, the action, the policy, the reward, a discount factor and a value function.

The state of the environment at time step t may be denoted by $S_t$, which represents the state of the environment at that moment. The UAV 102 has access to a set of observable states, denoted as S, which refers to the observations made by the UAV 102 regarding its own situation.

The action refers to a set of possible actions, denoted as A, within a given state S. At each time step t, the action taken is represented as $A_t$. In general, a set of available actions for the UAV 102 remains consistent across all states, allowing a single representation to define a complete action set A.

Further, the policy (denoted as Π) defines a behavior of the UAV 102 at a given time by mapping perceived states to corresponding actions. The policy guides the determination of the actions that the UAV 102 can take when the UAV 102 is in specific states. In an exemplary embodiment, the policy specifies probabilities associated with each possible action. The policy represents a probability (P) that the UAV 102 selects the action a in the state s at time step t, using equation (5):

$$\Pi(a|s) = P[A_t = a | S_t = s] \quad (5)$$

The reward (denoted as R) defines a desirability of the action. In other words, the reward defines good actions and bad actions that the UAV 102 can make. The environment gives the UAV 102, a numerical value called the reward. An objective of the UAV 102 is to maximize the reward it receives over time. For instance, in the UAV path planning, the UAV 102 can receive a positive reward for avoiding the obstacles and maintaining a stable flight path, while potential collisions or excessive altitude changes can result in negative rewards.

The discount factor may be denoted by γ, that determines an importance of the future rewards (i.e., rewards that the UAV 102 expects to receive over time as a result of its current and future actions, influencing long-term decision-making and strategy) compared to immediate rewards (i.e., rewards that the UAV 102 receives instantly after taking the action, reflecting short-term gains based on the immediate outcome of the action). In each state, when the UAV 102 takes the action, the UAV 102 receives the reward as compensation. The discount factor allows the UAV 102 to balance between the immediate rewards and the future rewards by enabling it to make decisions that align with either short-term objectives or long-term objectives based on a chosen value of the discount factor. In an embodiment, a value of the discount factor depends on a specific problem and goals of the UAV 102. For example, a higher discount factor (γ close to 1) encourages long-term planning, while a lower discount factor (γ close to 0) favors short-term gains.

The value function measures an expected future reward, that the UAV 102 may achieve from the given state while following a particular policy. The value function provides an estimate of how beneficial it is for the UAV 102 to be in a specific state. The value function is closely linked to the Bellman equation, which recursively updates an estimated value of the state based on the rewards obtained and the values of neighboring states. For example, in autonomous UAV navigation, a drone delivering a package can use the value function to assess whether to take a direct route through a high-wind zone or take a longer but more stable path to ensure safe delivery.

In an embodiment, the Q-learning model relies on the Bellman equation to balance the exploitation and the exploration while updating the Q-values and refining the policy over time. The Q-value, denoted as Q (s, a), represents the expected cumulative reward that the UAV 102 receives for taking the action a in the given state s and subsequently following the optimal policy. By continuously updating the Q-values, the Q-learning model enables the UAV 102 to learn a best course of action without requiring a model of the environment.

At each step, the UAV 102 observes the current state s, selects the action a, receives the reward r, and transitions to a new state s'. The Q-value for a current state-action pair is updated using the Bellman equation, which includes both the immediate reward and the estimated future reward. The updated Q-value can be obtained by using equation (6):

$$Q^{new}(s,a) = r_t \gamma \max Q(s_{t+1}+a), \tag{6}$$

where s represents the current state, a represents the action taken in the current state, $r_t$ represents the reward at time t, $\gamma$ represents the discount factor ranging between 0 and 1, $Q^{new}$ (s, a) represents new Q-value for the action a after taking the state s, $\max Q(s_{t+1}+a)$ represents maximum expected value among the policies that the UAVs 102 can receive.

Equation (6) ensures that the Q-learning model maximizes the cumulative rewards by incorporating both the immediate rewards and the future rewards. However, equation (6) is a simplified version of a Q-learning update process. In practical applications, a temporal difference (TD) learning method is used to iteratively refine the Q-values, by incorporating a learning rate $\alpha$, as shown in equation (7)

$$Q^{new}(s,a) = Q(s_{(t-1)}, a_{(t-1)}) + \alpha(r_t + \gamma \max Q(s_{t+1}+a) - Q(s_{(t-1)} - a_{(t-1)}))) \tag{7}$$

where $\alpha$ represents a learning rate ranging between 0 and 1, $Q(s_{(t-1)} - a_{(t-1)})$ represents an old Q-value for the action a after taking the state s, $(r_t + \gamma \max Q(s_{t+1}+a) - Q(s_{(t-1)} - a_{(t-1)}))$ represents the temporal difference.

The actor-critic reinforcement learning model can utilize a neural network architecture to enhance the decision-making process of the UAV 102. In an exemplary embodiment, by using the actor-critic reinforcement learning model, the path planning system 200 is configured to handle a large number of states and actions required for complex obstacle avoidance without performance issues that are associated with the Q-table. In the actor-critic reinforcement learning model, neural networks can be used as function approximators for both the policy and the value functions, allowing the UAV 102 to process high-dimensional input data efficiently and generalize the learning process of the UAV 102 across various scenarios.

The actor-critic reinforcement learning model integrates value-based and policy-based methods to enhance learning stability and efficiency. In an embodiment, the actor-critic reinforcement learning model includes an actor network (policy-based) and a critic network (value-based). The actor network can be configured to select the actions based on the current state of the UAV 102 (e.g., position, velocity, and detected obstacles). For instance, if the UAV 102 detects the obstacle ahead using the LiDAR sensors, the actor network determines whether it should turn left, right, ascend, or adjust speed to avoid a collision. The actor network corresponds to policy-based learning as the actor directly learns the optimal policy (action selection) without estimating values for all possible actions.

Meanwhile, the critic network can be configured to evaluate the quality of the selected action by estimating a long-term value of the selected action and providing feedback to the actor network. In an embodiment, the critic network assigns a higher value if the selected action results in efficient navigation with minimal energy consumption. Otherwise, the critic network recommends modifications to improve future decisions. For example, the critic network evaluates the consequences of increasing altitude, considering whether it improves safety and efficiency. If the UAV 102 avoids the collision and remains on an efficient path, the critic network assigns the positive reward; otherwise, the critic network issues the negative reward. The critic network corresponds to a value-based learning because the critic network learns the value function, which estimates the long-term reward for each action and helps guide the actor's decisions. This iterative process of action selection and value estimation allows the UAV 102 to refine its policy over time, leading to more efficient and adaptive navigation in the dynamic environments.

In an embodiment, the actor-critic reinforcement learning model is integrated with an experience replay memory to further enhance the learning process of the actor-critic reinforcement learning model. The experience replay memory refers to the storage of the past experiences (i.e., state, actions, rewards, next states) of the UAV 102 in a replay buffer. The experience replay memory can be, but not limited to, a uniform experience replay, a prioritized experience replay, a distributed experience replay, and other types of experience replay. Embodiments of the present disclosure are intended to include or otherwise cover any type of the experience replay memory, including known related art and/or later developed technologies.

During training, the UAV 102 periodically samples a batch of past experiences from the replay buffer and uses the past experiences to update neural network parameters. As used herein, the term "neural network parameters" refers to values that the model learns during training to improve its predictions or decisions. The neural network parameters are weights and biases (adjust during training to optimize the policy and the value function), policy parameters (define the actor network's policy and are updated based on feedback from the critic network), value function parameters (define the critic network's estimation of expected rewards and are updated based on observed rewards and future state predictions), the learning rate (controls a step size for updating network parameters, balancing between stability and convergence speed), discount factors (determines how much future rewards influence current decisions), and so forth. The experience replay memory helps mitigate an issue of correlated data in sequential decision-making, leading to more stable and efficient learning. In other words, the experience replay memory mitigates the issue by storing the past experiences in a buffer and randomly sampling the past experiences during the training. This breaks the correlation between consecutive samples, ensuring that the UAV 102 learns from a more diverse set of experiences, leading to better generalization and improved decision-making.

In addition, by reusing the past experiences, the UAV 102 may learn more effectively from its interactions with the environment. The experience replay memory prevents the UAV 102 from forgetting earlier learned behaviors. Therefore, integrating the experience replay memory with the actor-critic reinforcement learning model results in a more robust and data-efficient training process, improving the UAV's decision-making and adaptability in the dynamic environments.

To effectively manage the movement of the UAV 102 within the dynamic environment, the reward component 206 is configured to calculate the rewards used to train the UAV's navigation and help avoid obstacles while reaching the destination. As used herein, the term "rewards" refers to feedback provided to the UAV 102 based on the actions in various situations. The reward component 206 uses the path generated by the IPSO 212 to assess UAV's progress. In addition, the reward component 206 is configured to calculate the reward as a part of the path planning by the DRL-based planner component 216 to determine potential paths and converge to the optimal path for the UAV 102. In an embodiment, the reward component 206 calculates the rewards using several methods, each addressing different factors of the UAV's navigation and environmental conditions.

In an exemplary embodiment, a distance-calculation method is used to calculate a distance between a current position of the UAV 102 and the destination (or goal), which determines how close or far the UAV 102 is from reaching the destination. For example, suppose the UAV 102 is 50 meters away from the destination. In that case, the reward component 206 returns the positive reward proportional to how close the UAV 102 is to the destination (e.g., +10 for every 10 meters closer to the destination). In another embodiment, a reward dictionary method is used to map different UAV situations to specific reward values. For instance, if the UAV 102 encounters the obstacle, the UAV 102 can receive the negative reward (penalty). In contrast, if the UAV 102 follows the optimal IPSO path, then the UAV 102 can receive the positive reward.

The reward component 206 identifies and processes different situations (obstacles or IPSO paths) that the UAV 102 may encounter while navigating towards the destination to ensure optimal learning for the UAV 102. Each situation is associated with a specific reward value, influencing the UAV's decision-making process. Over time, the UAV 102 learns to adjust its actions based on the feedback, optimizing its navigation strategy and improving its ability to reach the destination while avoiding the moving obstacles efficiently.

In one embodiment, the reward component 206 is configured to award the positive reward when the UAV 102 follows the IPSO path, making this path preferable to others. For example, if the UAV 102 closely follows the IPSO path, the UAV 102 may receive a reward of +50. In another embodiment, the reward component 206 is configured to incur the negative reward as the penalty when the UAV 102 potentially collides with any obstacles or goes outside a boundary. For instance, if the UAV 102 will collide with the obstacle, the reward component 206 will incur a penalty of −100 to discourage such actions. In yet another embodiment, the reward component 206 is configured to award the positive reward as the UAV 102 follows the IPSO path and gets closer to the destination. For example, as the UAV 102 decreases its distance to the destination, the reward component 206 assigns an incremental positive reward for every 10 meters closer to the destination. In another embodiment, the reward component 206 is configured to assign a small negative reward when the UAV 102 reaches a free cell that is not part of the IPSO path, discouraging deviation from the reference path. For example, if the UAV 102 strays from the path by 5 meters, a small penalty of −10 may be applied, with the penalty varying depending on how far the UAV 102 is from the destination.

The energy model 208 is configured to calculate energy required by the UAV 102 to reach the destination, for optimizing the path planning and navigation process of the UAV 102. In an embodiment, the energy model 208 is configured to calculate the energy required by the UAV 102 for various flight activities, such as vertical flight, horizontal flight, hovering, and turning, which are all essential components of the flight path of the UAV 102.

In an embodiment, the energy model 208 is configured to calculate the energy required by the UAV 102 during the vertical flight for both climbing and descending. The energy required for climbing a vertical distance $\Delta h$ at a velocity $v_{climb}$ is calculated using equation (8):

$$E_{climb}\Delta h = P_{climb}\frac{\Delta h}{v_{climb}}, \tag{8}$$

where $E_{climb}$ indicates the energy required by the UAV 102 to climb (or ascend) and $P_{climb}$ represents a constant factor representing power required to climb per unit distance.

Similarly, the energy required for descending over the vertical distance $\Delta h$ at a velocity $v_{desc}$ is calculated using equation (9):

$$E_{desc}\Delta h = P_{desc}\frac{\Delta h}{V_{desc}}, \tag{9}$$

where $E_{desc}$ indicates the energy required by the UAV 102 to descend and $P_{desc}$ represents a constant factor representing the power required by the UAV 102 to descend per unit distance.

The energy model 208 can be configured to calculate the energy required by the UAV 102 for hovering, where the UAV 102 maintains its position in the air from time $t_1$ to time $t_2$ is calculated using equation (10):

$$E_{hovr}=P_{hovr}(t_2-t_1), \tag{10}$$

where $E_{hovr}$ indicates the energy required to hover in place. $P_{desc}$ represents a constant factor representing power required by the UAV 102 to hover in place per unit of time and $t_2-t_1$ represents a duration of time the UAV 102 spends hovering, calculated as a difference between a final time $t_2$ and an initial time $t_1$.

The energy model 208 can also be configured to calculate the energy required by the UAV 102 for the horizontal flight. In an embodiment, the energy required for the horizontal flight depends on a horizontal distance d traveled at a horizontal velocity v, as shown in equation (11)

$$E_{horiz} = P_v\frac{d}{v}, \tag{11}$$

where $E_{horiz}$ indicates the energy required by the UAV 102 during the horizontal flight and $P_v$ represents power required by the UAV 102 to fly horizontally at a constant speed.

In an embodiment, for UAV's rotation, the energy model 208 is configured to calculate the energy required to cover an angle $\theta$ using equation (12), by considering an angular speed $\omega_{turn}$ (2.1 radian per second (rad/s)) and a constant power $P_{turn}$ (225 Watt per second (W/s)).

$$E_{turn} = P_{turn}\frac{\Delta\theta}{\omega_{turn}}, \tag{12}$$

where $E_{turn}$ indicates the energy required by the UAV 102 to complete a turn, 40 represents an angle (in radians) by which the UAV 102 needs to turn.

The energy model 208 can be configured to calculate a total energy consumption E during the UAV's flight by using equation (13)

$$E=E_{climb}+E_{desc}+E_{hovr}+E_{horiz}+E_{turn} \tag{13}$$

The energy model 208 is further configured to add an additional amount of reward (cumulative reward) depending on the required energy. In an embodiment, the total energy consumption E is used in a reward function to influence the UAV's decision-making process. The reward is calculated by using equation (14):

$$R_t = r_t + \left(0.5\left(\frac{1}{1+E}\right)\right), \quad (14)$$

where $R_t$ is a cumulative reward, $r_t$ is a current reward, and E is the total energy consumption to reach the destination.

In an embodiment, the reward component 206 is configured to encourage the UAV 102 to follow the most energy-efficient path by providing higher rewards when the UAV 102 approaches the destination while reducing the energy consumption.

FIG. 2B illustrates a graphical analysis 218 of a random function map 220 and a logistic map 222, according to certain embodiments. The graphical analysis 218 compares distribution characteristics of values generated by the random function map 220 and the logistic map 222 over 10,000 iterations. The graphical analysis 218 illustrates that the logistic map 222 exhibits a more uniform distribution of values across a range [0, 1], whereas the random function map 220 demonstrates slight variations in density. The enhanced uniformity in the logistic map 222 contributes to a broader and more diverse search space, which is beneficial for applications such as UAV path optimization.

In an exemplary embodiment, the logistic map 222 enhances the UAV path optimization by preventing clustering effects often associated with purely random initialization methods. In conventional random initialization approaches, initial waypoints tend to be unevenly distributed across the search space, leading to inefficient path selection and local stagnation. However, logistic map initialization enhances the uniform distribution of waypoints, facilitating better global search capabilities and improving convergence rates.

Figure 3:
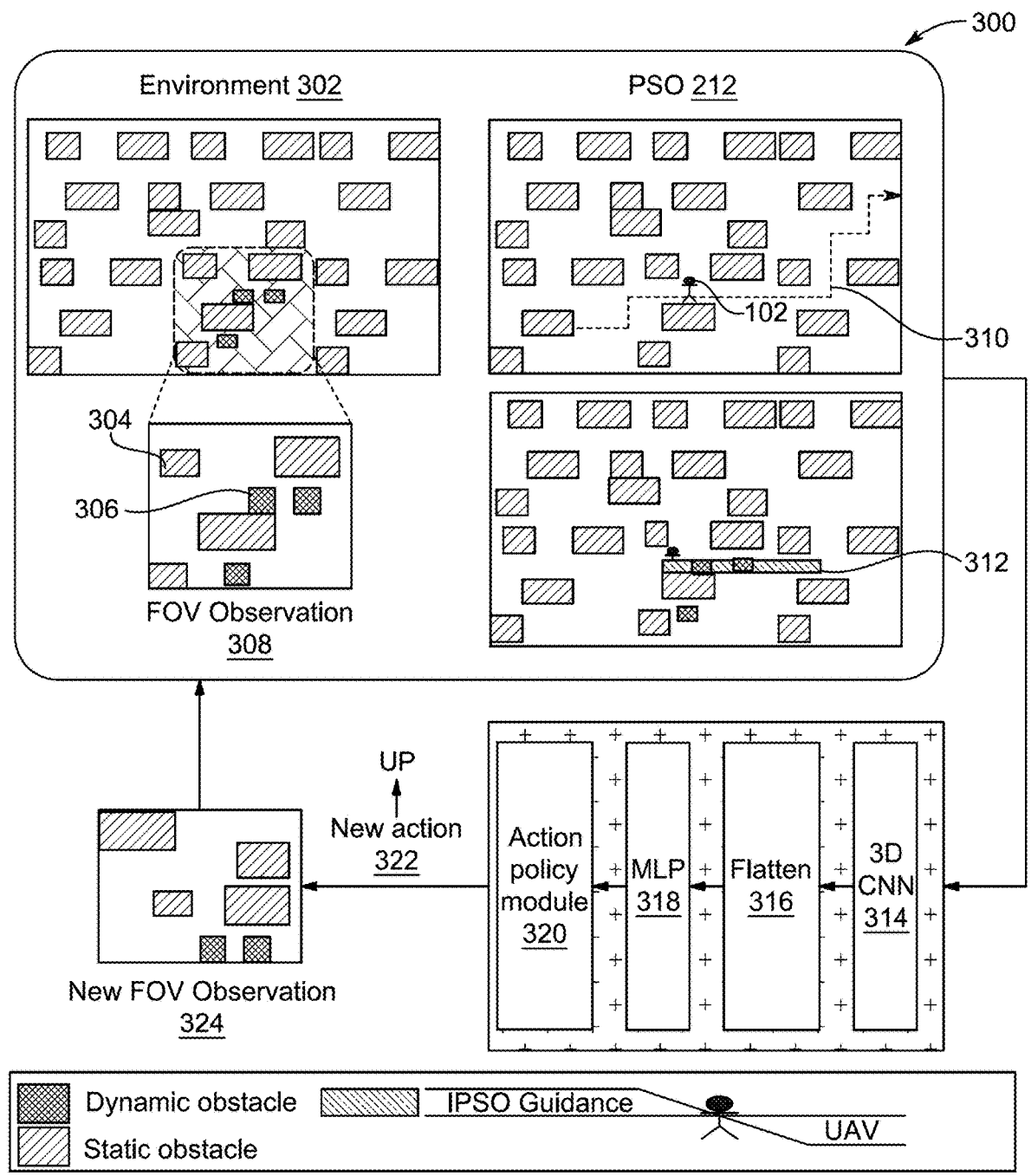
FIG. 3 illustrates an exemplary improved particle swarm optimization-deep reinforcement learning (IPSO-DRL) framework, according to certain embodiments.

FIG. 3 illustrates an exemplary IPSO-DRL framework 300, according to certain embodiments. The IPSO-DRL framework 300 integrates the path planning generated by the PSO component 210 and the DRL-based planner component 216 to optimize the UAV navigation in a complex environment 302 (e.g., urban landscapes with high-rise buildings, forests with uneven terrain, disaster-affected zones with debris, industrial sites with moving machinery). The IPSO-DRL framework 300 processes environmental information, including static obstacles 304 and dynamic obstacles 306, and optimizes UAV actions (e.g., adjusting altitude, changing direction, accelerating or decelerating, and hovering) while considering the energy consumption.

As shown in FIG. 3, the UAV 102 operates in the environment 302 containing the static obstacles 304 and the dynamic obstacles 306, where the static obstacles 304 include fixed structures such as buildings and walls, while the dynamic obstacles 306 include moving objects like other UAVs, the vehicles, or pedestrians. Instead of processing the entire environment 302 at once, which would be computationally intensive and inefficient and prohibit real-time maneuvering, the UAV 102 relies on a limited field of view (FoV) observation 308 (localized observation) to make real-time navigation decisions. The FoV observation 308 represents immediate surroundings visible to the sensors of the UAV 102, allowing the UAV 102 to focus on relevant environmental data (i.e., the static obstacles 304, the dynamic obstacles 306, weather conditions, and so forth) while efficiently planning the movement of the UAV 102.

By utilizing the localized FoV observation 308, the UAV 102 is capable to detect nearby obstacles (ensures that the UAV 102 recognizes potential hazards within its path, such as a suddenly appearing drone or a moving vehicle, allowing the UAV 102 to adjust the trajectory accordingly), identify safe and navigable spaces (enables the UAV 102 to assess areas free of obstructions and determine a best route forward), and extract spatial features and temporal features for efficient movement planning (enhances the ability of the UAV 102 to navigate efficiently). In an exemplary embodiment, the spatial features enable the UAV 102 to understand the relative positions and dimensions of the obstacles, while the temporal features allow the UAV 102 to anticipate the movements by predicting how the dynamic obstacles 306, such as the pedestrians or other UAVs, will move over time.

As the UAV 102 navigates through the environment 302, the UAV 102 follows an actual path 310 that continuously evolves based on real-time FoV observation 308. The actual path 310 is influenced by the detected static obstacles 304 and dynamic obstacles 306, ensuring that the UAV 102 makes precise trajectory adjustments to avoid collisions and optimize the movement. Since environmental conditions are constantly changing, the UAV 102 needs to continuously update the FoV observation 308, allowing the UAV 102 to adapt in real-time. However, because the UAV 102 operates in an uncertain environment with unpredictable elements, the UAV 102 cannot rely solely on learned experiences and local observations. Therefore, a global navigation strategy is required to enhance efficiency and reduce unnecessary exploration, ensuring that the UAV 102 follows an optimal yet adaptable trajectory while maintaining energy efficiency.

To provide global guidance, an IPSO guidance path 312 represents a globally optimized trajectory generated using the IPSO 212. The IPSO guidance path 312 serves as a reference, helping the UAV 102 minimize energy consumption and navigate efficiently through the static obstacles 304. However, since the IPSO guidance path 312 does not account for real-time environmental changes, such as the moving obstacle 306, the UAV 102 requires continuous adaptation.

To achieve real-time adaptive navigation, the IPSO guidance path 312 is fed into the DRL-based planner component 216, which processes the IPSO guidance path 312 with the FoV observation 308. The DRL-based planner component 216 can utilize a CNN-based architecture including 3D CNN 314, a flatten layer 316, a multi-layer perceptron (MLP) 318, and an action policy module 320. The 3D CNN 314 extracts the spatial features and the temporal features from the current FoV observation 308 of the UAV 102 for capturing environmental details such as obstacle distribution, free spaces, and movement trends of dynamic objects. In an exemplary embodiment, the 3D CNN 314 extracts the spatial features and the temporal features from the FoV observation 308 by processing a sequence of captured frames, allowing it to analyze both the spatial and temporal structure of the environment 302. The spatial feature extraction involves identifying relative positions, shapes, and sizes of the static obstacles 304 and the free spaces within a sensing range of the UAV 102, enabling precise navigation. Also, the temporal feature extraction is performed by analyzing consecutive frames to detect motion patterns of the dynamic obstacles 306. By tracking changes in obstacle positions across time, the 3D CNN 314 enables the UAV 102 to predict the movement trends, anticipate potential collisions, and proactively adjust its trajectory.

The extracted spatial and temporal features are further processed through the flattened layer 316. In an exemplary embodiment, the flatten layer 316 transforms high-dimensional feature maps (i.e., spatial and temporal features) into a structured one-dimensional vector, making it compatible with fully connected layers of the MLP 318. By structuring the high-dimensional feature maps into a single vector, the flatten layer 316 allows the DRL-based planner component 216 to maintain feature integrity while enabling efficient processing by the MLP 318.

The MLP 318 processes the flattened feature vectors, which are the structured output of the flatten layer 316, and refines the flattened feature vectors for decision-making. In an embodiment, each neuron in the MLP 318 processes a combination of inputs (flattened feature vectors) by applying weighted summation followed by an activation function (e.g., Sigmoid), allowing the MLP 318 to model non-linear relationships. The non-linear relationships enable the MLP 318 to learn complex patterns, such as correlations between obstacle density, UAV velocity, and optimal trajectory adjustments. In an embodiment, the MLP 318 is trained using RL techniques, where weights of the MLP 318 are updated based on reward signals to approximate an optimal action-value function (Q-values).

The action policy module 320 translates learned representations of the MLP 318 into the UAV actions. The action policy module 320 determines a best possible action (e.g., move forward, turn left, adjust altitude) based on the Q-values generated by the MLP 318. In an embodiment, the action policy module 320 utilizes at least one of a stochastic policy (selecting actions based on probabilities) or a deterministic policy (selecting the action with a highest Q-value) to select the best possible new action 322.

To drive a learning-based planning process, the reward function may be designed to incorporate the IPSO guidance path 312 in a reward calculation, ensuring that the UAV 102 is encouraged to balance the exploration and the exploitation. In an embodiment, the reward function assigns the positive rewards when the UAV 102 follows the energy-efficient, obstacle-free paths aligned with the IPSO guidance path 312 while penalizing inefficient or high-risk decisions. By incorporating IPSO-based rewards, the UAV 102 is motivated to explore multiple potential paths while gradually converging toward the optimal trajectories.

Once the new action 322 is selected, the UAV 102 executes the new action 322, resulting in a new position and an updated Field of View (FoV) observation 324. This continuous feedback loop ensures that each action taken by the UAV 102 refines the understanding of the environment 302, leading to improved decision-making over time. The updated FoV observation 324 is then reprocessed by the DRL-based planner component 216, incorporating latest environmental changes, and another action is generated accordingly. This iterative process allows the UAV 102 to dynamically adjust its path, ensuring real-time responsiveness to the moving obstacles, efficiency in the navigation, and adherence to IPSO-optimized route whenever possible. Through the integration of global optimization (IPSO) and local decision-making (DRL-based CNN model), the IPSO-DRL framework 300 maintains scalability, adaptability, and energy-efficient path planning, making it highly effective for the UAV navigation in dynamic environments.

Simulation Analysis:

To evaluate an IPSO-RL framework (including both Q-learning model and actor-critic reinforcement learning model) for the UAV path planning and obstacle avoidance with minimal energy consumption, an environment was simulated with static obstacles and dynamic obstacles, where the UAVs 102 was modeled as RL agents, to navigate efficiently. The environment was structured as an 8×8×4 space, containing three static obstacles and two dynamic objects, with the UAVs 102 operating at a speed of 10 meters per second (m/s) and dynamic obstacles moving at 1 m/s. The simulation implementation utilized Macintosh Operating System (macOS) Sonoma as an operating system, with processing capabilities provided by Apple M2 or Intel i5, and memory configurations of either 8 Gigabytes (GB) or 16 GB. The IPSO-RL framework was developed in Python 3.10.10, leveraging TensorFlow 2.15.0 for DRL training. To ensure an optimal balance between the exploration and the exploitation, an epsilon decay technique was applied. The Q-learning model was configured with a learning rate ($\alpha$) of 0.01, a discount factor ($\gamma$) of 0.99, and an initial exploration rate ($\epsilon$) of 1.0, which gradually decays to 0.02 over time. For training a DRL approach (i.e., actor-critic reinforcement learning model), a more refined parameter set was employed, having a learning rate of 0.0001, a discount factor of 0.95, and an exploration rate decaying from 1.0 to 0.01. Additionally, a batch size of 64 and a replay memory size of 1000 were used to enhance the learning stability and the efficiency. The simulation results of the IPSO-RL framework are discussed below in FIG. 4 to FIG. 13.

Figure 4A:
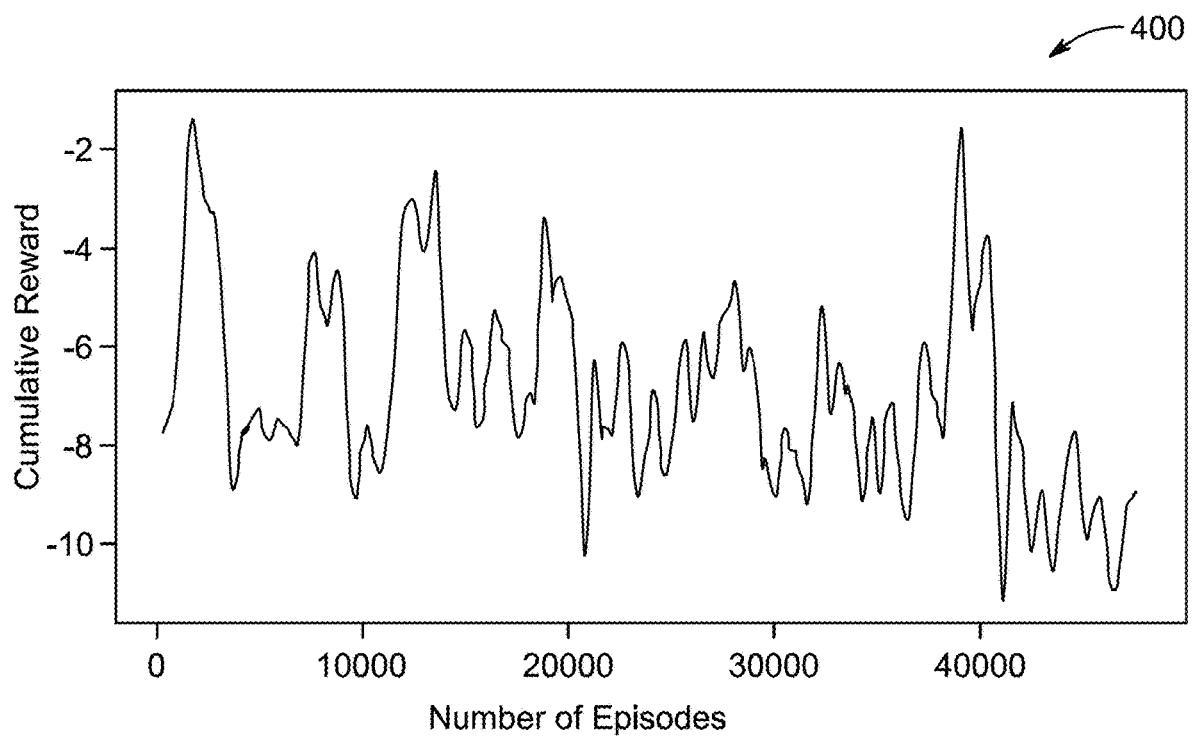
FIGS. 4A to 4H illustrate performance of a UAV during a learning process in a graphical form, according to certain embodiments.
Figure 4B:
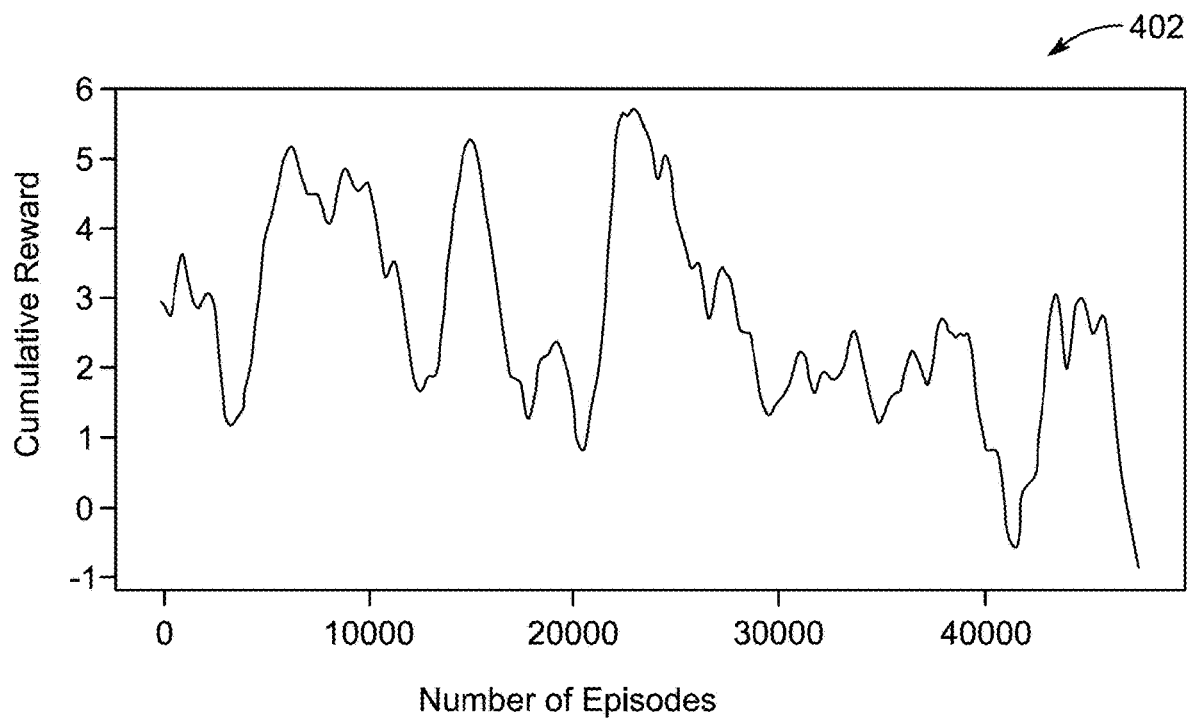
Figure 4C:
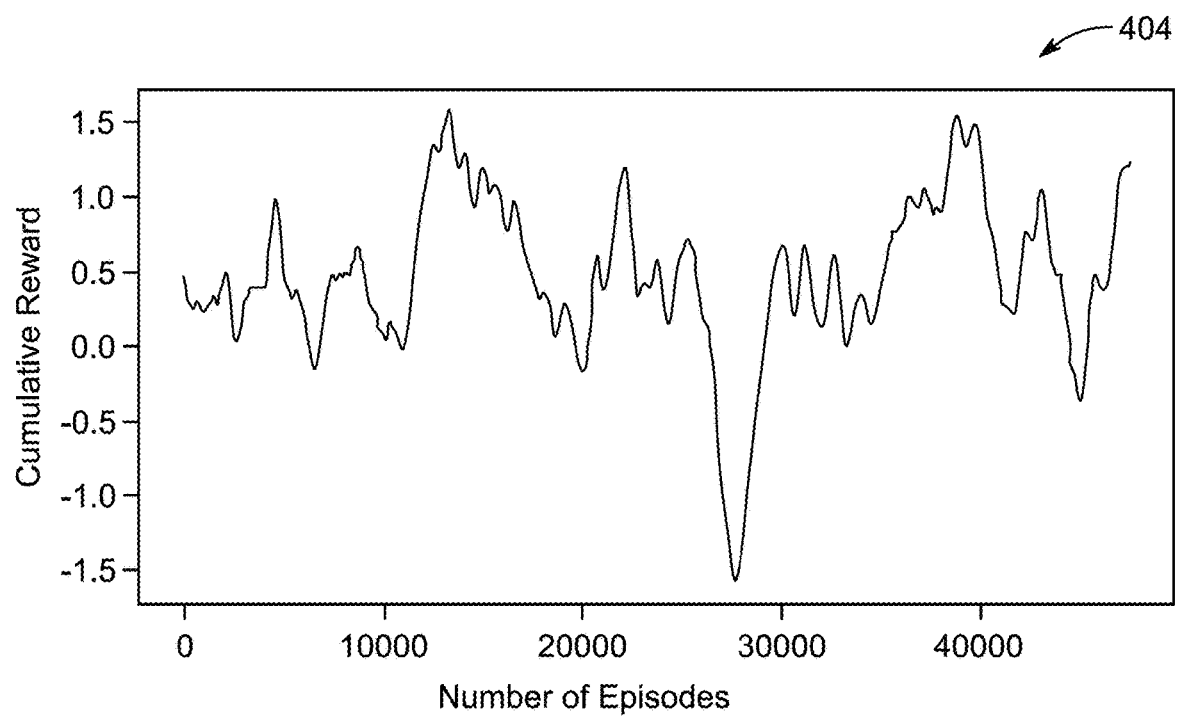
Figure 4D:
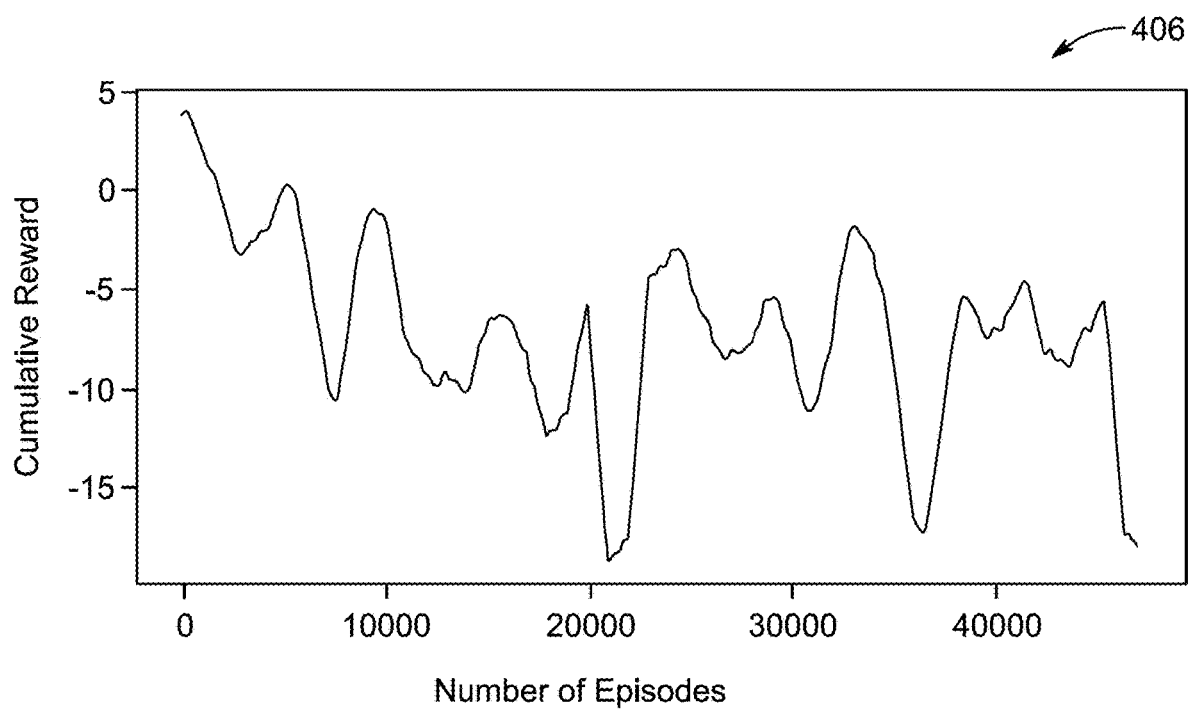
Figure 4E:
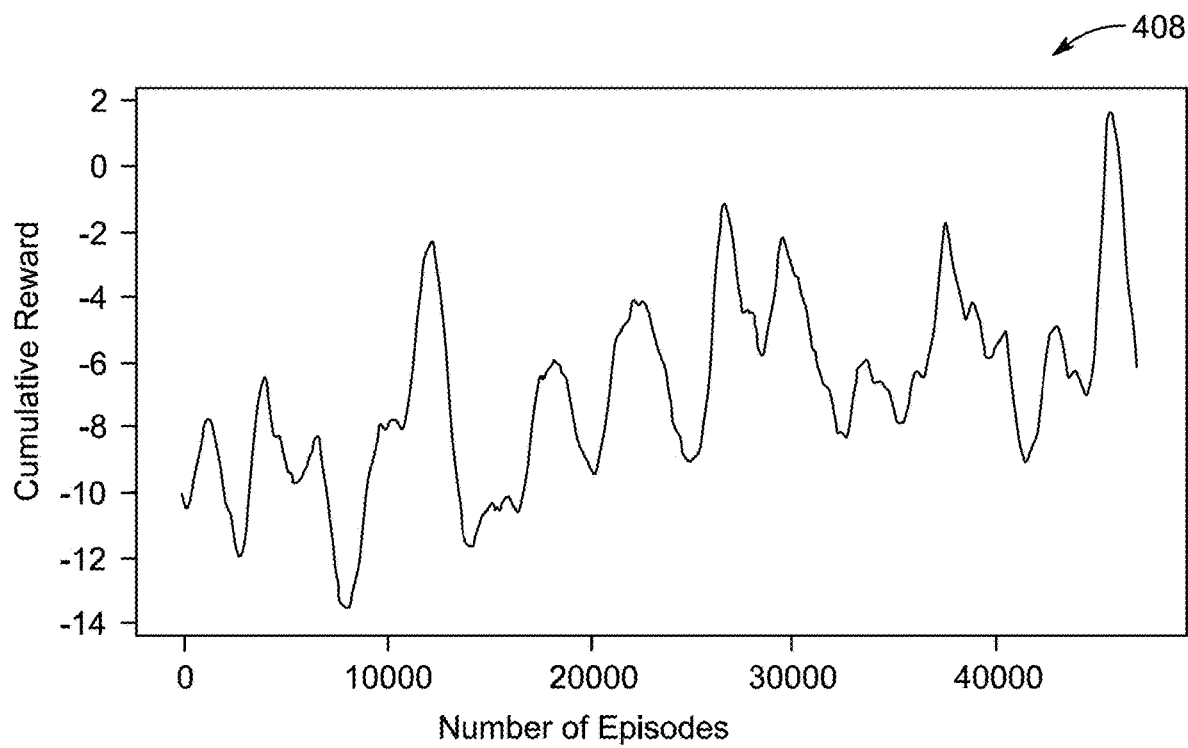
Figure 4F:
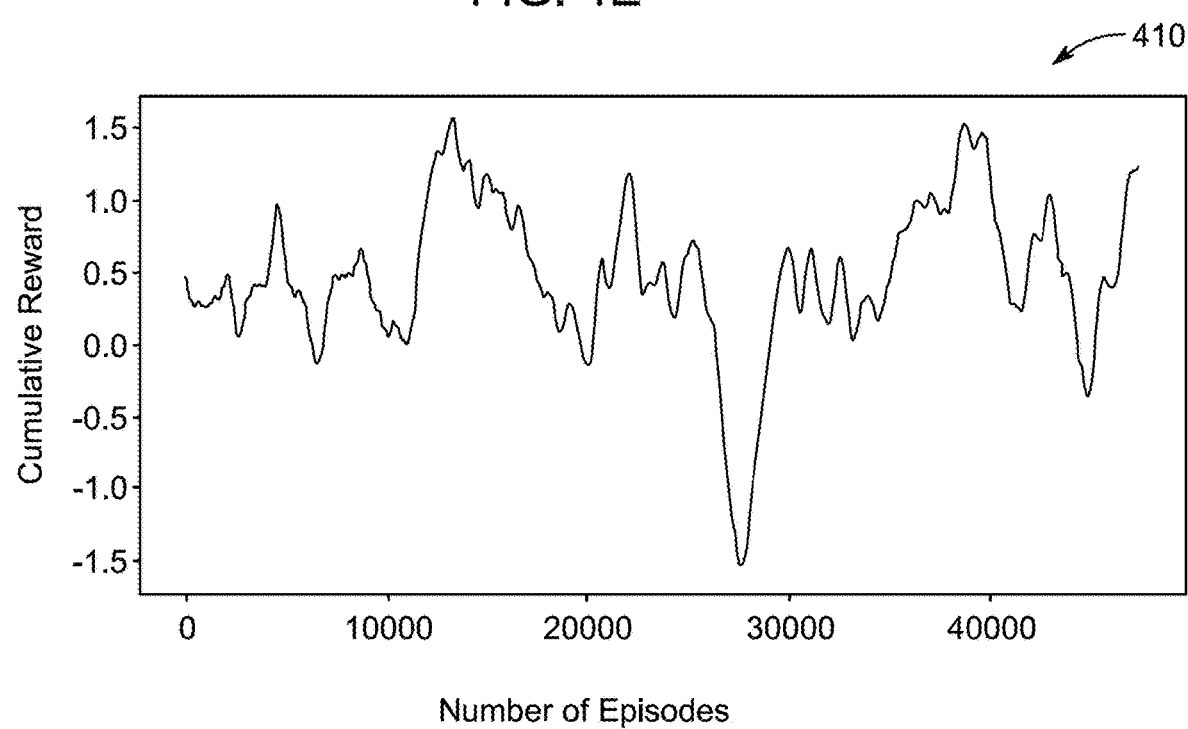

FIGS. 4A to 4H illustrate a performance of the UAV 102 during a simulation-based learning process in a graphical form, according to certain embodiments. FIGS. 4A to 4H represent how the UAV 102 improved its decision-making over a number of episodes based on a selected set of parameters, providing insights into the effectiveness of the IPSO-RL framework. The graphical representation depicts the cumulative reward with respect to a number of episodes for different values of the set of parameters. The set of parameters analyzed in the IPSO-RL framework includes the exploration rates ($\epsilon$), the learning rate ($\alpha$), and the discount factor ($\gamma$). Over 50,000 episodes, a training performance of the UAV 102 was analyzed to achieve optimal performance. When promising results were identified, a range of the set of parameters was extended and an additional training was conducted with the parameters to confirm their efficacy. In FIG. 4A, a first graph 400 represents the training performance of the UAV 102 with a first set of parameters, where the learning rate ($\alpha$) is 0.01, the discount factor ($\gamma$) is 0.99, and the exploration rate ($\epsilon$) is 0.9. The higher exploration rate leads to greater variability in the cumulative rewards, indicating extensive exploration of different strategies. In FIG. 4B, a second graph 402 represents the training performance with a second set of parameters, where $\alpha$ is 0.01, $\gamma$ is 0.99, and $\epsilon$ is 0.5. With a relatively lower exploration rate, the UAV 102 exhibited fluctuations in the cumulative rewards as it balanced between the exploration and the exploitation. The fluctuations in the cumulative rewards indicated that the learning process was still adapting, with the UAV 102 frequently testing new strategies rather than following a stable policy. In FIG. 4C, a third graph 404 represents the training performance with a third set of parameters, where $\alpha$ is 0.01, $\gamma$ is 0.99, and $\epsilon$ is 0.1. A lower exploration rate reduces randomness in decision-making, leading to more stable learning. However, as observed in the graph 404, the cumulative reward continues to fluctuate, indicating that fine-tuning is required to reach the optimal performance. In FIG. 4D, a fourth graph 406 represents the training performance with a fourth set of parameters, where $\alpha$ is 0.0001, $\gamma$ is 0.99, and $\epsilon$ starts at 1.0 and decays to 0.02. Initially high exploration rate results in variations in the cumulative reward, as the UAV 102 actively explores different strategies. However, as e decays, learning stabilizes, and the UAV 102 refines its decision-making. In FIG. 4E, a fifth graph 408 represents the training performance with a fifth set of parameters, where $\alpha$ is 0.001, $\gamma$ is 0.99, and $\epsilon$ starts at 1.0 and decays to 0.02. The lower learning rate results in smoother transitions, allowing the UAV 102 to make incremental adjustments to its policy. In FIG. 4F, a sixth graph 410 represents the training performance with a sixth set of parameters, where $\alpha$ is 0.1, $\gamma$ is 0.99, and $\epsilon$ starts at 1.0 and decays to 0.02. The higher learning rate accelerates weight updates, leading to the fluctuations in the cumulative reward. As the exploration decays, the UAV 102 starts to converge, showing a gradual improvement in the performance over the episodes.

Figure 4G:
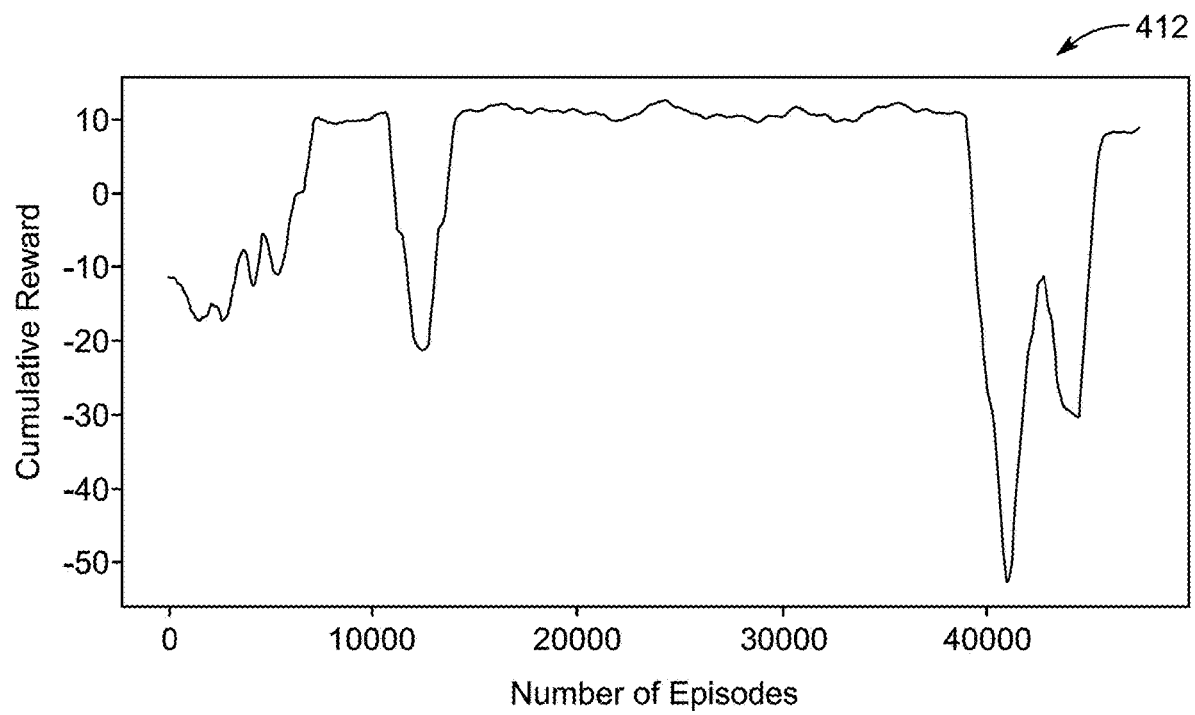
Figure 4H:
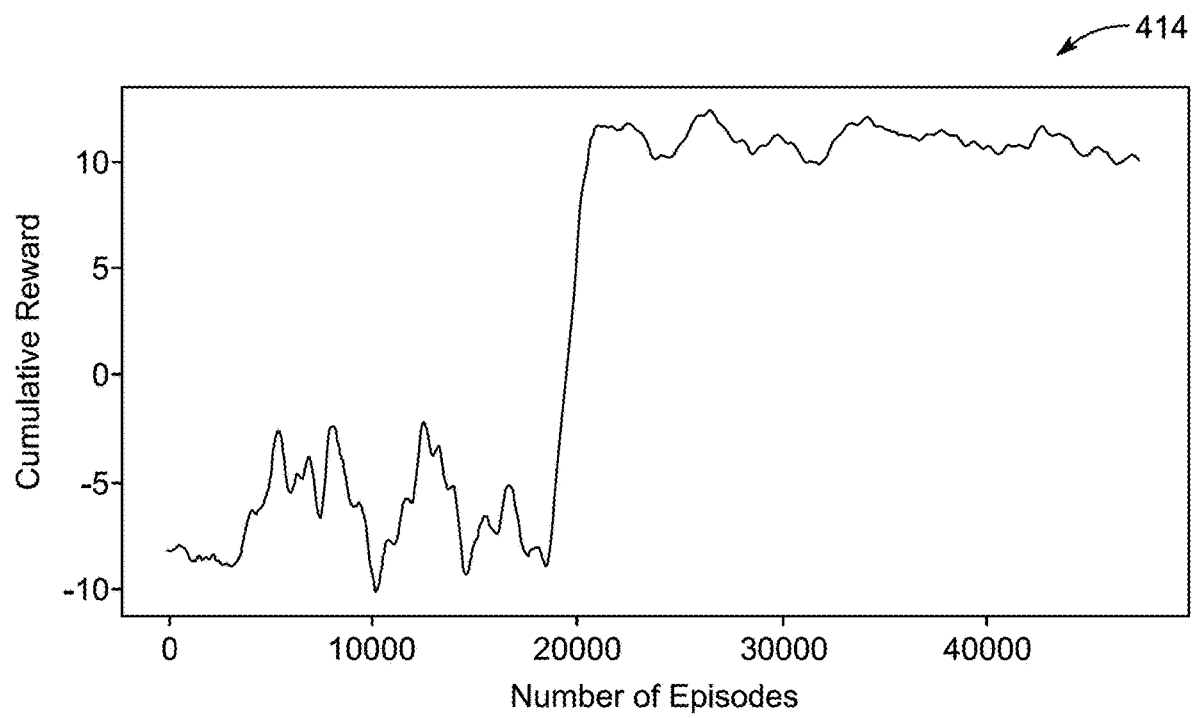

In FIG. 4G, a seventh graph 412 represents the training performance with a seventh set of parameters, where $\alpha$ is 0.01, $\gamma$ is 0.7, and $\epsilon$ starts at 1.0 and decays to 0.02. The graph 412 shows an initial phase of fluctuations, followed by a sharp increase in the cumulative reward, after which the performance stabilizes. In FIG. 4H, an eighth graph 414 represents the training performance with an eighth set of parameters, where $\alpha$ is 0.01, $\gamma$ is 0.99, and $\epsilon$ starts at 1.0 and decays to 0.02. The graph 414 indicates a relatively stable learning curve with high cumulative rewards for most episodes. The results in FIGS. 4A to 4H illustrate how the parameters influence the training performance of the UAV 102, with lower e values contributing to more stable learning and higher $\gamma$ values promoting long-term reward maximization. The observed trends indicate that the IPSO-RL framework effectively enhances the UAV's ability to navigate the dynamic environments by refining its decision-making process throughout a training period.

Figure 5:
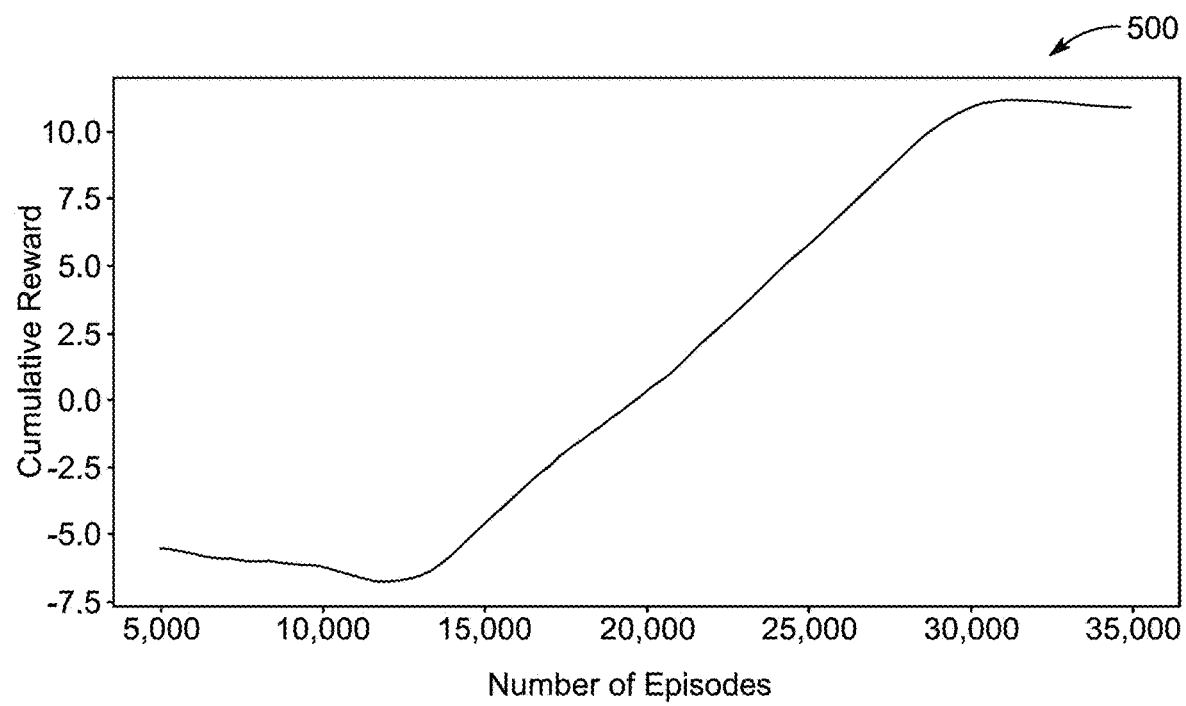
FIG. 5 illustrates a smaller-scale visualization of the learning process, according to certain embodiments.

FIG. 5 illustrates a smaller-scale visualization 500 of the learning process, according to certain embodiments. The smaller-scale visualization 500 represents an interval where $\alpha$ gradual increase in the cumulative reward occurs for the IPSO-DRL framework 300 with the energy model 208. The smaller-scale visualization 500 illustrates an early stage of training, focusing on an initial 30,000 episodes, where the UAV 102 transitions from random exploration to structured learning. As shown in FIG. 5, a sharp rise in the cumulative reward after approximately 15,000 episodes indicates that the UAV 102 has started learning energy-efficient flight paths, optimizing the movement patterns to minimize unnecessary energy consumption while still achieving navigation objectives. Further, a gradual stabilization after 30,000 episodes indicates that the UAV 102 is converging toward the optimal policy, where further improvements become marginal. This early-phase analysis is crucial for evaluating how quickly the UAV 102 adapts to the environment and how the inclusion of the energy model 208 impacts an initial learning speed of the UAV 102.

Figure 6:
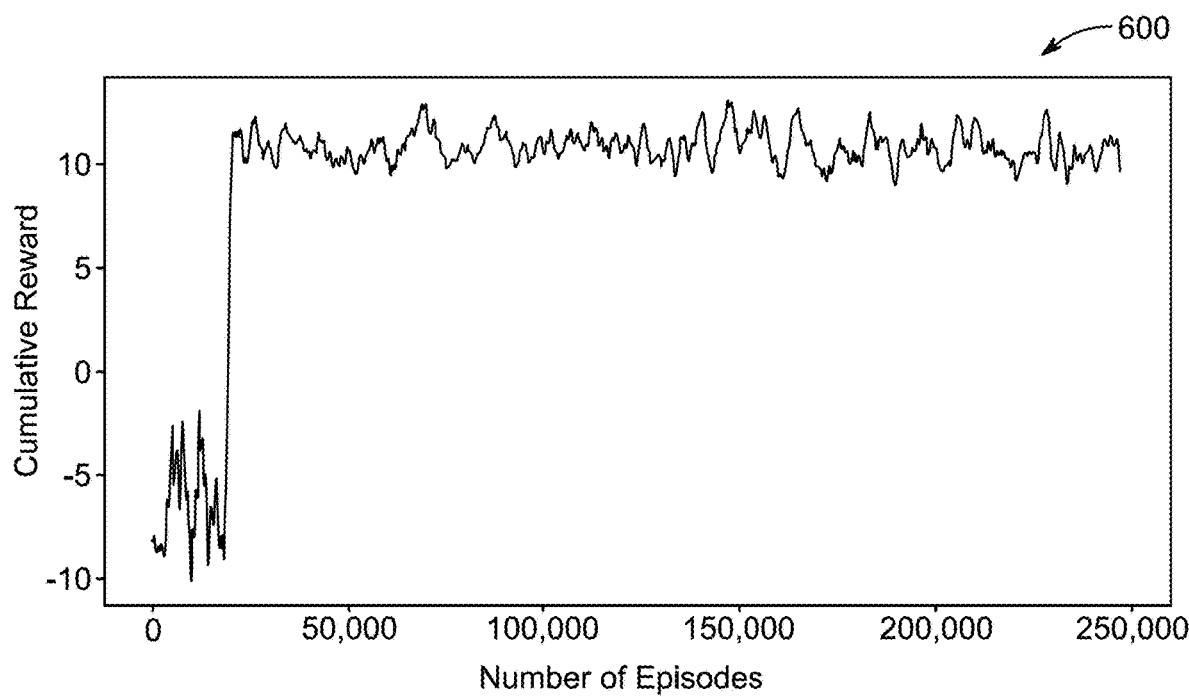
FIG. 6 illustrates a reward curve for IPSO-RL framework (Q-learning model) with an energy model, according to certain embodiments.

FIG. 6 illustrates a reward curve 600 for the IPSO-RL framework (Q-learning model) with the energy model 208, according to certain embodiments. The reward curve 600 represents the cumulative reward obtained by the UAV 102 throughout the learning process (i.e., full 250,000 training episodes). In other words, the reward curve 600 represents how the UAV 102 consistently improves its decision-making ability over time, as indicated by a steady increase in the cumulative reward. Initially, the UAV 102 explores different actions and policies, leading to fluctuating or lower values of the cumulative reward. However, as training progresses, particularly after 15,000 episodes, the UAV 102 refines its navigation strategy, focusing on energy-efficient movement while effectively avoiding the obstacles. The reward curve 600 continues to rise until it stabilizes, signifying that the UAV 102 has successfully learned the optimal policy.

Figure 7:
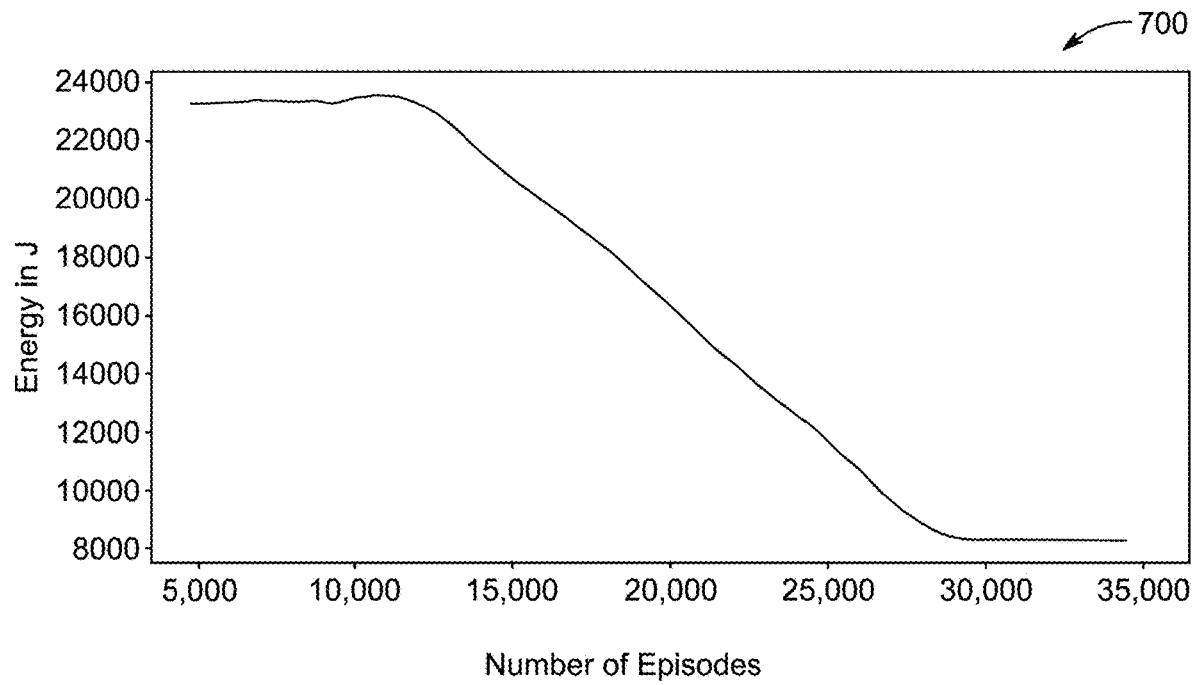
FIG. 7 illustrates a graph representing an energy consumption trend of the UAV throughout the learning process, according to certain embodiments.

FIG. 7 illustrates a graph 700 representing an energy consumption trend of the UAV 102 throughout the learning process, according to certain embodiments. The graph 700 illustrates how energy usage decreases significantly as the training progresses. Initially, during an exploration phase, the UAV 102 makes inefficient movements, consuming more energy due to unoptimized flight paths, excessive accelerations, and unnecessary altitude adjustments. As the training episodes increase, the UAV 102 learns to optimize its actions, resulting in a steady decline in the energy consumption. FIG. 7 illustrates the effectiveness of incorporating the energy model 208 in the training process, as the UAV 102 gradually reduces its energy consumption while maintaining high performance.

Figure 8:
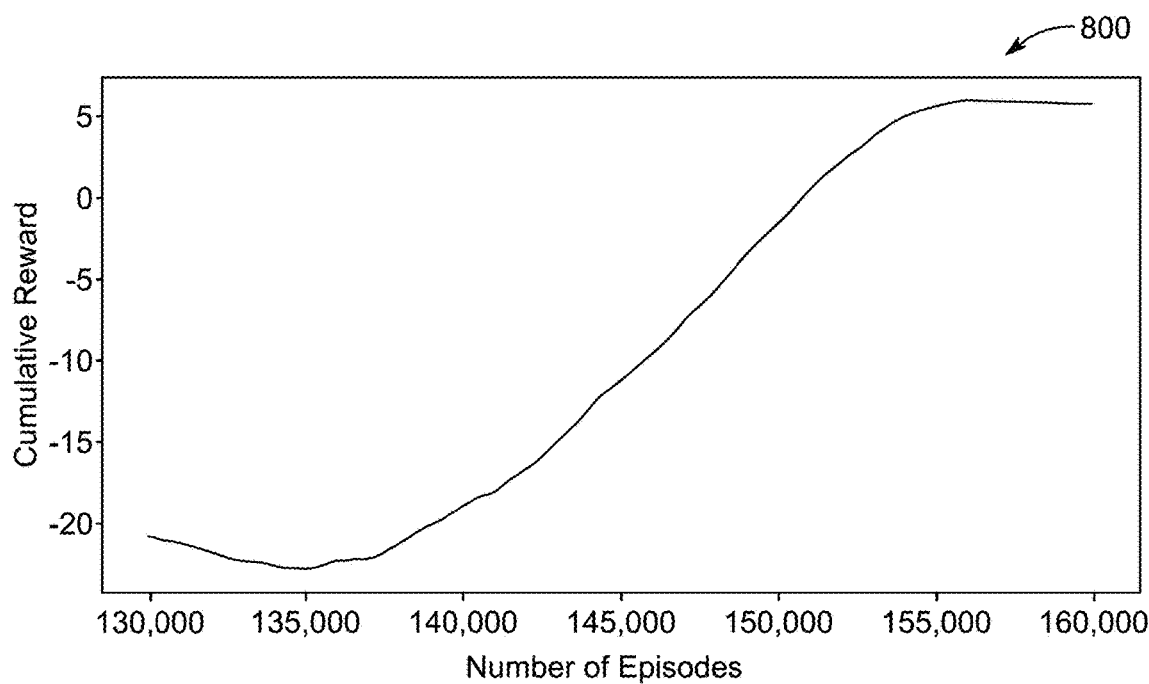
FIG. 8 illustrates a graph showing a point at which the learning process of the UAV begins to accelerate when training without an energy model, according to certain embodiments.

FIG. 8 illustrates a graph 800 showing a point at which the learning process of the UAV 102 begins to accelerate when training without the energy model 208, according to certain embodiments. Unlike the IPSO-RL framework with the energy model 208, where performance improvements were observed after approximately 15,000 episodes, the learning process of the UAV 102 without the energy model 208 is significantly slower. As shown in FIG. 8, an exponential improvement phase starts after approximately 135,000 episodes, meaning that the UAV 102 requires a much longer exploration period before identifying effective navigation strategies. During the initial episodes, the UAV 102 followed suboptimal trajectories, consuming excessive energy and making inefficient movements due to the lack of explicit energy constraints. However, once the 135,000-episode mark was reached, the UAV 102 began to discover more efficient paths, leading to a sharp increase in cumulative reward values. A learning curve continued to rise steeply until approximately 155,000 episodes, where the UAV 102 reached its optimal performance level, stabilizing at a near-optimal policy. This delayed improvement phase illustrates a critical role of the energy model 208 in accelerating the learning process, as the energy model 208 provides structured guidance that helps the UAV 102 converge toward energy-efficient policies much earlier.

Figure 9:
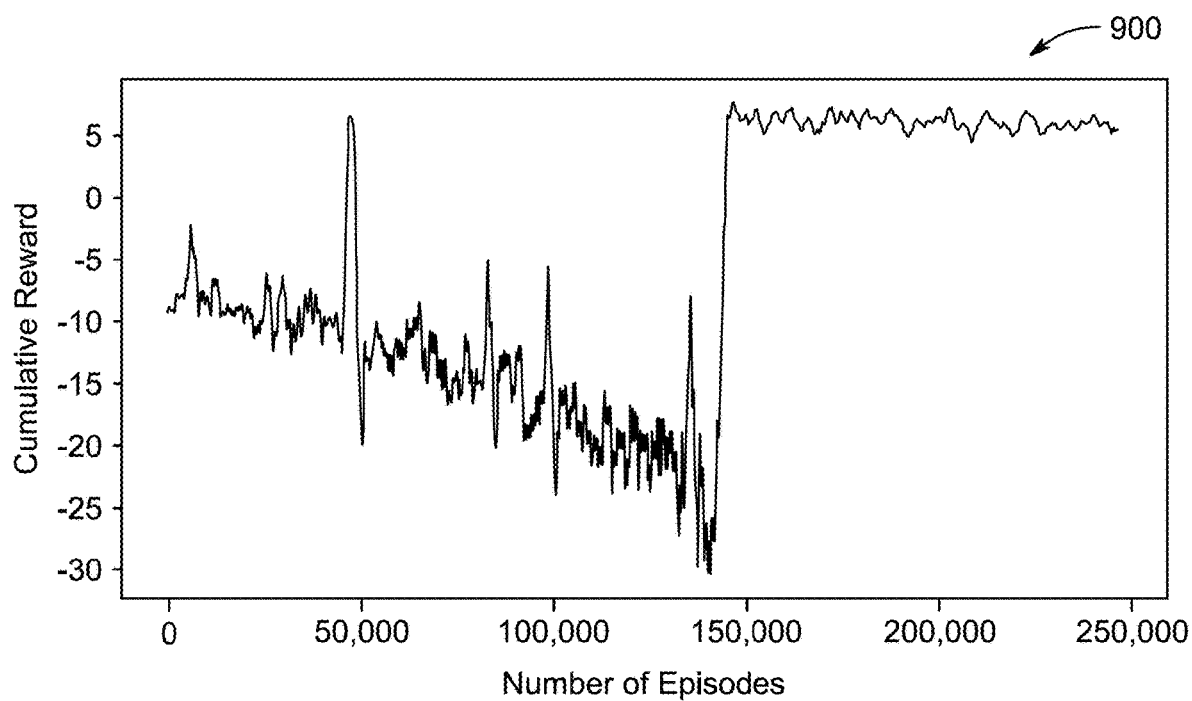
FIG. 9 illustrates a cumulative reward curve for improved particle swarm optimization-reinforcement learning (IPSO-RL) framework without using the energy model for all episodes (i.e., over 250,000 episodes), according to certain embodiments.

FIG. 9 illustrates a cumulative reward curve 900 for IPSO-RL framework without using the energy model 208 for all episodes (i.e., over 250,000 episodes), according to certain embodiments. The cumulative reward curve 900 shows that during the initial 50,000 episodes, the cumulative reward curve 900 fluctuates with frequent spikes and drops, indicating that the UAV 102 is still exploring and learning the navigation strategies without an optimized approach. As the training progresses between 50,000 and 135,000 episodes, the cumulative reward curve 900 decreases gradually, with significant instability and sharp downward trends, indicating that the UAV 102 is following inefficient trajectories, consuming excessive energy, and failing to establish a stable learning pattern.

Between 135,000 and 150,000 episodes, the cumulative reward curve 900 experiences a steep drop, reaching its lowest point, which indicates a critical phase where the UAV 102 is struggling to adapt. However, after approximately 150,000 episodes, the cumulative reward curve 900 increases sharply, marking the point at which the UAV 102 begins to learn more optimal navigation policies. The cumulative reward curve 900 stabilizes beyond 155,000 episodes, reaching a consistent level that indicates that the UAV 102 has found an efficient strategy for navigation. This delayed improvement illustrates the issues of the learning process without the energy model 208, as the UAV 102 requires significantly more episodes to reach an optimal performance compared to training with the energy model 208.

Figure 10:
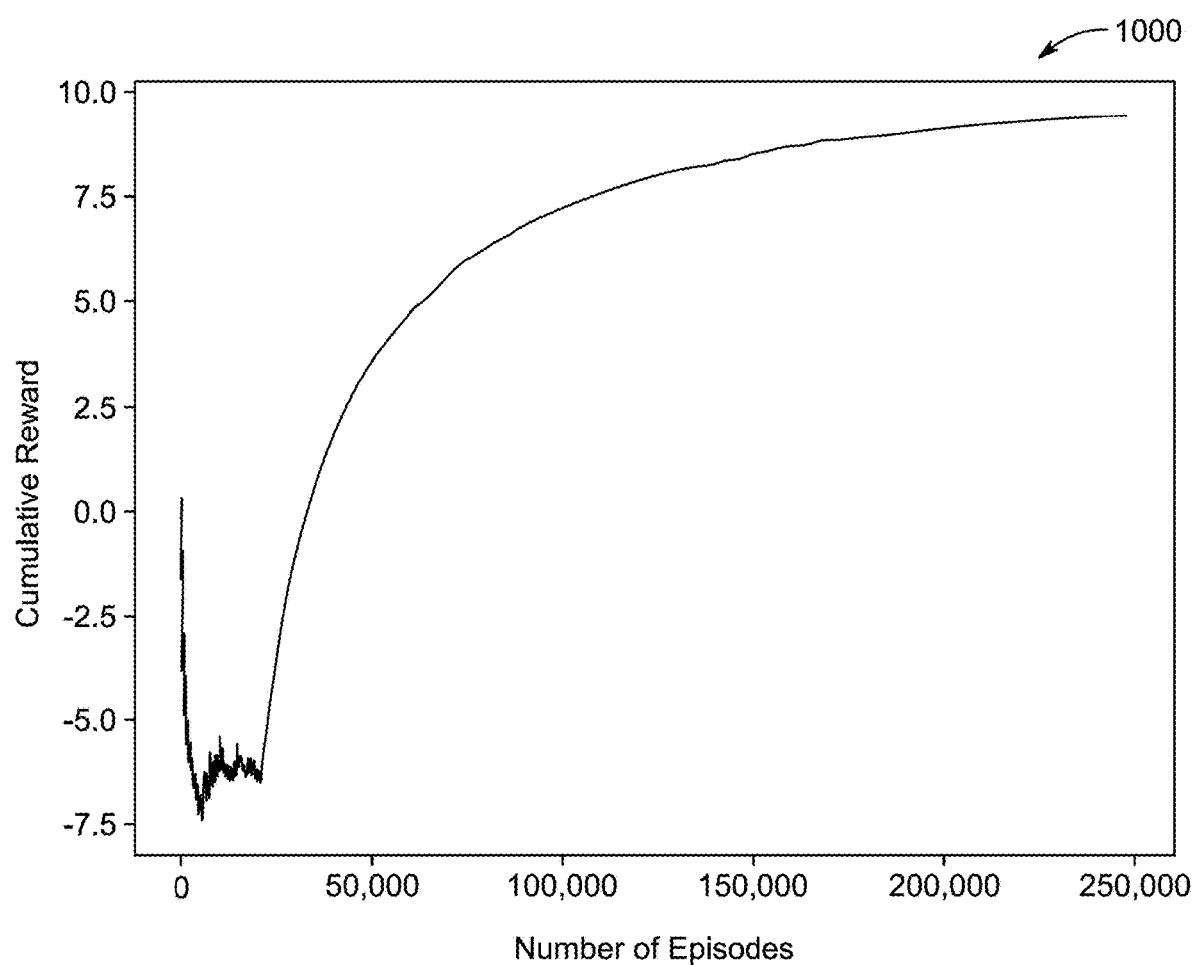
FIG. 10 illustrates a moving average reward curve for IPSO with the energy model, according to certain embodiments.

FIG. 10 illustrates a moving average reward curve 1000 for the IPSO 212 with the energy model 208, according to certain embodiments. FIG. 10 depicts the cumulative reward over an extended training period, spanning up to 250,000 episodes. The cumulative reward initially drops, due to early-stage exploration, but as the number of episodes increases, the policy of the UAV 102 significantly improves, leading to a consistent upward trend in the cumulative reward. The inclusion of the energy model 208 accelerates the learning, leading to a more efficient learning process, and demonstrating that the UAV 102 optimizes its path planning and resource utilization over a prolonged training period.

Figure 11:
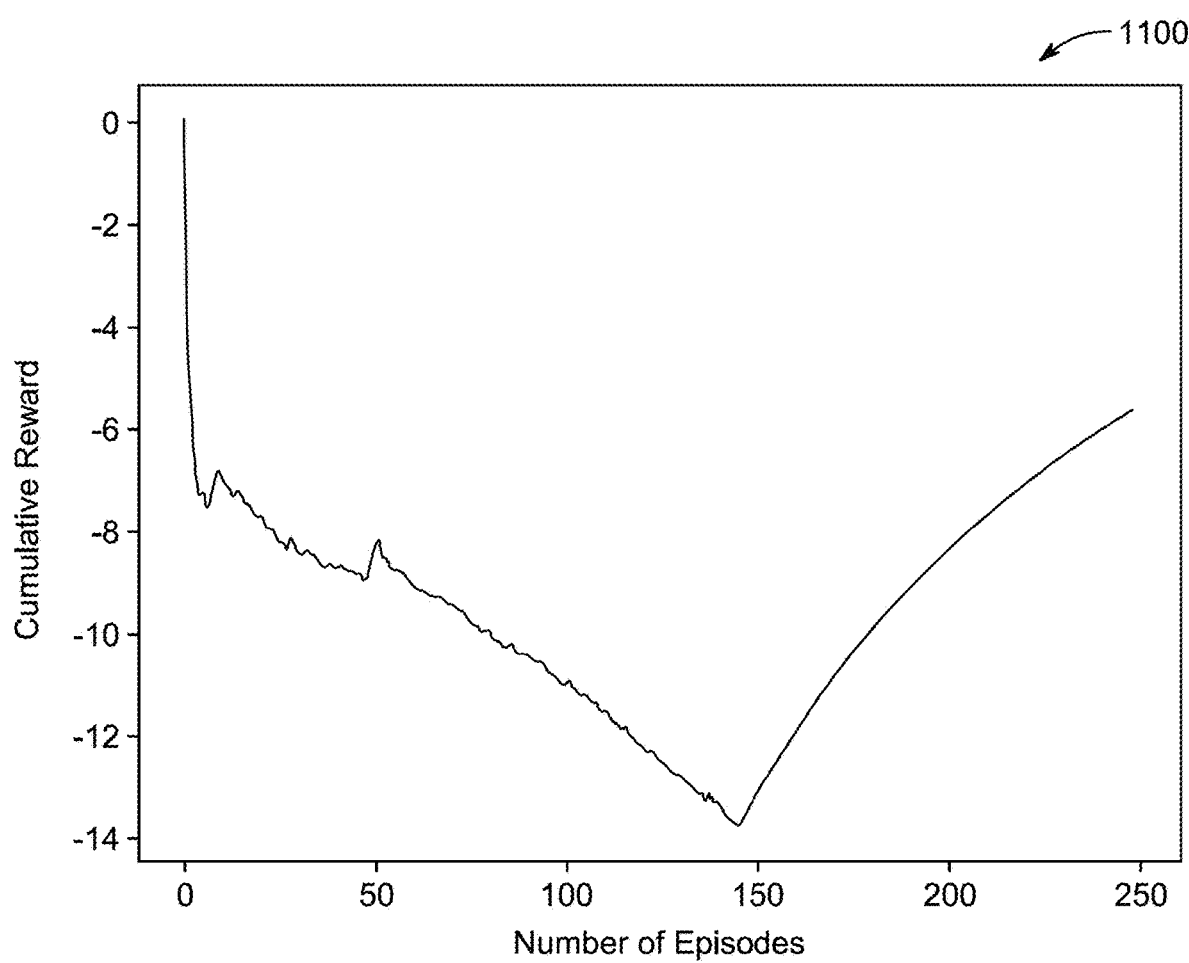
FIG. 11 illustrates a moving average reward curve for the IPSO without the energy model, according to certain embodiments.

FIG. 11 illustrates a moving average reward curve 1100 for IPSO 212 without the energy model 208, according to certain embodiments. FIG. 11 depicts the cumulative reward with respect to the number of episodes, illustrating the UAV's learning progress over time. Initially, the cumulative reward fluctuates as the UAV 102 explores different strategies, but over approximately 250 episodes, the UAV 102 policy stabilizes, and the cumulative reward begins to improve. The sharp decline in early episodes indicates a period of high exploration, followed by a gradual transition to exploitation, where the UAV 102 refines its decision-making strategy. The lowest reward is observed at around 150 episodes, after which the policy begins to stabilize and improve, indicating that the UAV 102 is learning to navigate more effectively.

Figure 12:
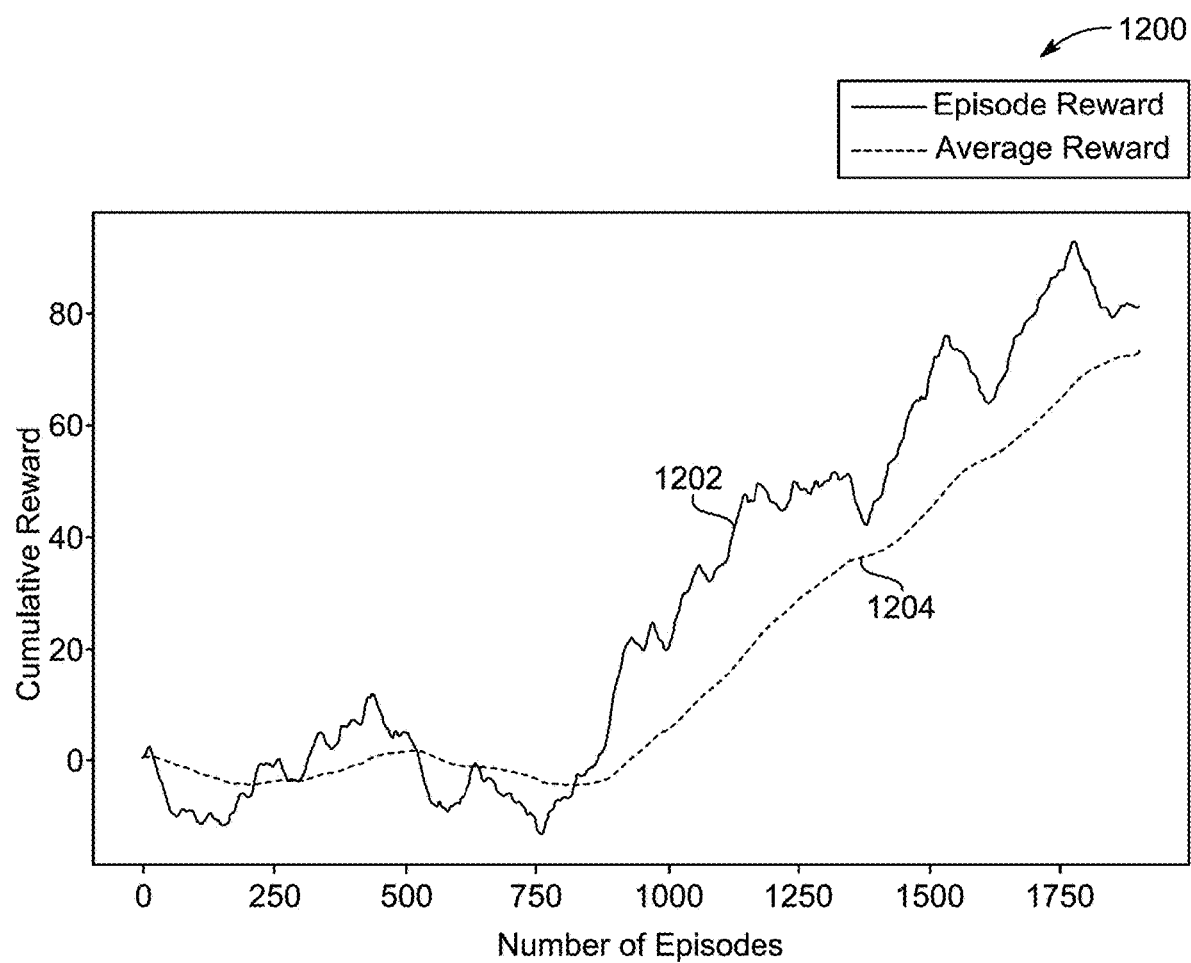
FIG. 12 illustrates a reward curve for the IPSO-DRL framework, according to certain embodiments.

FIG. 12 illustrates a reward curve 1200 for the IPSO-DRL framework 300, according to certain embodiments. The reward curve 1200 illustrates a learning progression of the IPSO-DRL framework 300 over multiple episodes. FIG. 12 shows a rapid improvement in both an episode reward 1202 and a moving average reward 1204, indicating the effectiveness of the IPSO-DRL framework 300. The steep upward trend in the cumulative reward indicates that the IPSO-DRL framework 300 quickly learns the optimal policies within fewer episodes. This indicates advantages of deep reinforcement learning, where the IPSO-DRL framework 300 efficiently captures complex relationships and high-dimensional patterns. The use of deep learning allows the UAV 102 to develop more expressive and efficient representations, leading to faster convergence and higher-quality solutions.

In contrast, the IPSO-RL plot (shown in FIG. 6) displays a more gradual improvement in the reward curve. While the IPSO-RL approach still illustrated a positive learning trend, a magnitude of the cumulative rewards achieved was generally lower than the IPSO-DRL framework 300. The difference in performance may be attributed to the inherent strengths of DRL techniques, such as their ability to capture complex relationships and patterns in high-dimensional state spaces. The use of deep learning in the IPSO-DRL framework 300 allows the UAV 102 to learn more expressive and efficient representations of a problem, leading to faster convergence and higher-quality solutions.

Figure 13:
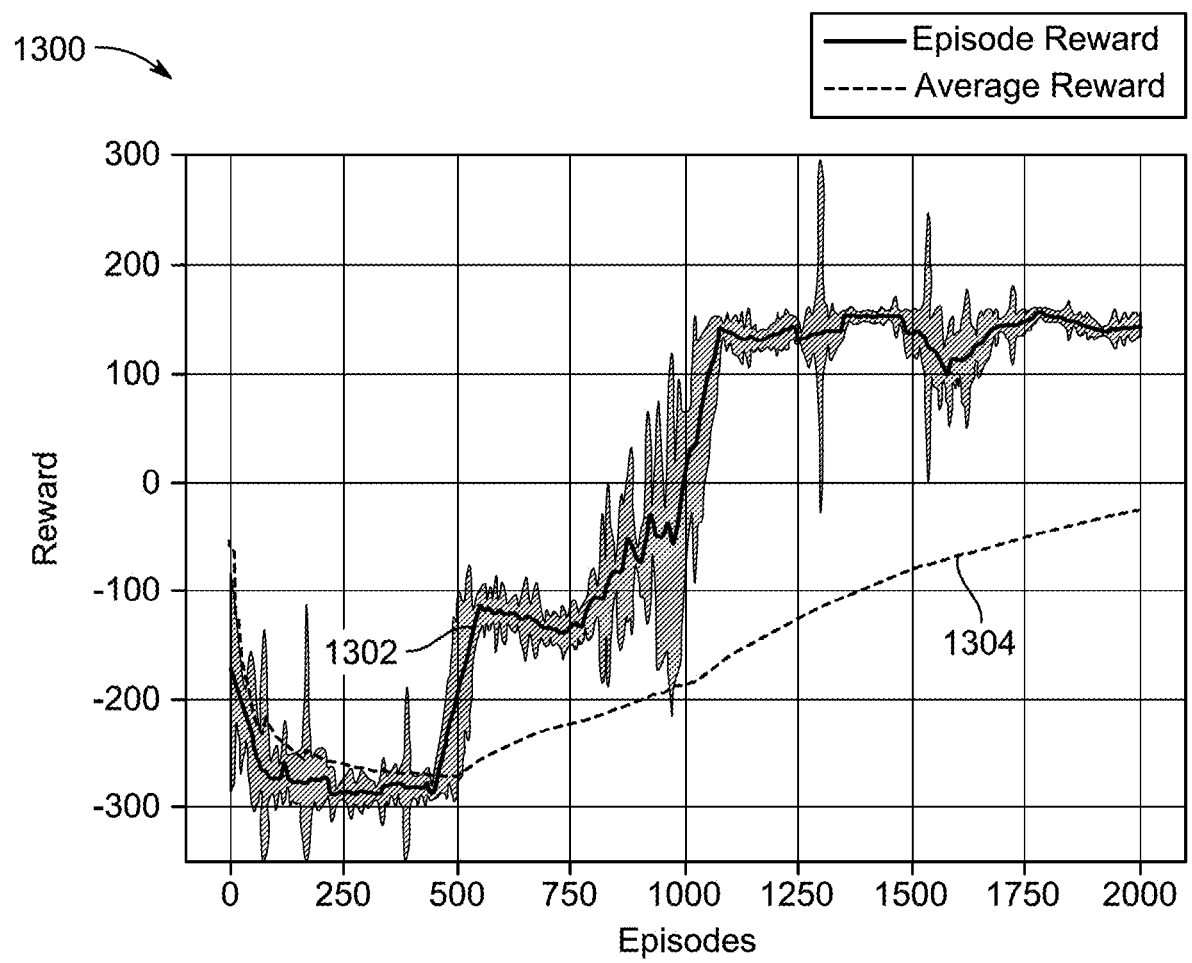
FIG. 13 illustrates a reward curve for a conventional framework that employs an improved DRL technique for path planning in dynamic environments, according to certain embodiments.

FIG. 13 illustrates a reward curve 1300 for a conventional framework that employs an improved DRL technique for path planning in the dynamic environments, according to certain embodiments. The conventional framework utilizes a prioritized experience replay dueling deep double Q networks (D3QN) algorithm with double Q-learning to estimate the Q-values of agent's action. The episode reward curve 1302 in FIG. 13 exhibits fluctuations as the model learns from interactions with the environment, reflecting variations in the UAV's performance across the episodes. In contrast, the average reward curve 1304 smooths out these fluctuations, providing a clearer representation of an overall learning trend. FIG. 13 shows that while the conventional framework leads to gradual improvements in the rewards, the cumulative reward of the conventional framework stabilizes at a lower level than the level achieved by the IPSO-DRL framework 300. This indicates that while the model of the conventional framework successfully learns to navigate the dynamic environments, its learning capability and overall performance do not achieve a high cumulative reward as compared to the IPSO-DRL framework 300.

Figure 14:
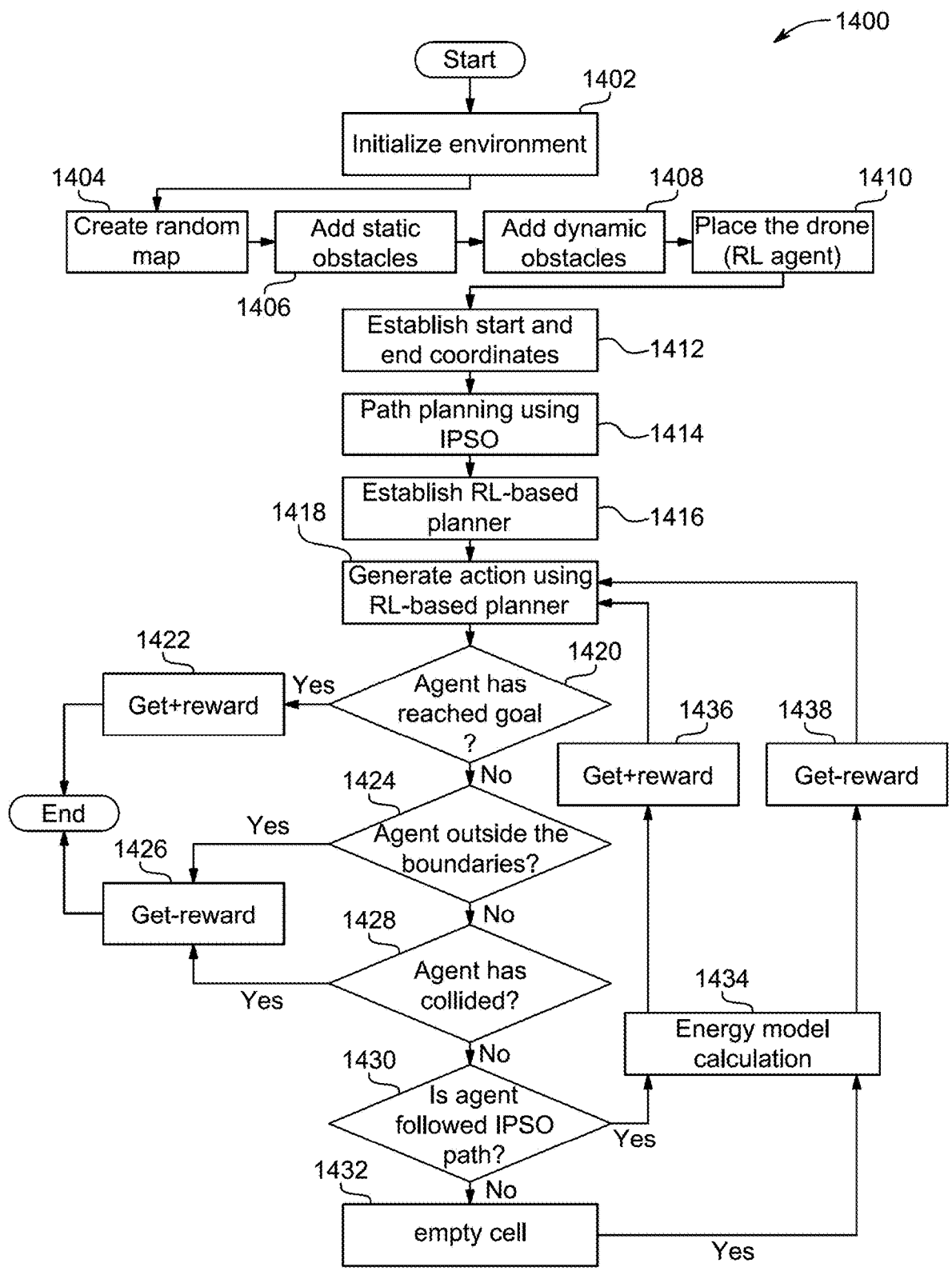
FIG. 14 illustrates a flowchart of a path planning method for the UAVs, according to certain embodiments.

FIG. 14 illustrates a flowchart of a path planning method 1400 for a simulation of the UAVs 102, according to certain embodiments. The method 1400 includes a series of steps. These steps are only illustrative, and other alternatives may be considered where one or more steps are added, one or more steps are removed, or one or more steps are provided in a different sequence without departing from the scope of the present disclosure.

At step 1402, the method 1400 includes initializing the environment. During initialization, a spatial layout is defined, ensuring that the obstacles are placed within predefined environment dimensions at random and feasible locations. This step also includes setting environment parameters, such as grid size, boundaries, and environmental constraints, to establish a structured simulation space.

At step 1404, the method 1400 includes creating a random map. This step includes generating a spatial environment where the UAV 102 operates. This involves defining a structured or grid-based representation of the environment and placing the obstacles, waypoints, and open spaces according to a random but controlled process.

At step 1406, the method 1400 includes adding the static obstacles in the random map. In an embodiment of the simulation, the static obstacles may be placed based on predefined rules (e.g., minimum clearance rule, no-fly zone rule, height-based placement rule) within spatial boundaries. In another embodiment of the simulation, the static obstacles may be randomly placed within the spatial boundaries.

At step 1408, the method 1400 includes adding the dynamic obstacles in the random map. In an embodiment, the dynamic obstacles follow predefined motion patterns (i.e., linear motion, periodic oscillation, grid-based navigation). In another embodiment, the dynamic obstacles follow probabilistic movement behaviors (e.g., Markov Decision Processes (MDP)-based motion, where the next position is determined based on a probability distribution; Reinforcement Learning (RL)-driven motion, where the dynamic obstacles adjust movement based on learned policies). In an embodiment, velocities, directions, and movement constraints of the dynamic obstacles are set to simulate real-world interactions.

At step 1410, the method 1400 includes placing the UAV 102 as the RL agent. In an embodiment, the RL agent is placed at a randomly selected feasible starting location within the environment. In an embodiment, initial parameters such as velocity, altitude, and battery levels of the RL agent are also initialized accordingly.

At step 1412, the method 1400 includes establishing start coordinates and end coordinates, which define initial and target positions for the RL agent within the environment. The start coordinates correspond to deployment locations of the RL agent. In an embodiment, the deployment locations are predefined based on mission requirements. In another embodiment, the deployment locations are randomly assigned within an operational area. The end coordinates represent designated destinations, such as a delivery point, a surveillance target, or a rendezvous location of the RL agent. The end coordinates may be determined based on specific objectives of the RL agent, ensuring that the RL agent align with overall mission goals. In an embodiment, a selection of the start coordinates, and the end coordinates involves obstacle placement, ensuring that the RL agent is not initialized within restricted zones or collision-prone areas. Once established, the start and end coordinates serve as input parameters for the reinforcement learning framework, guiding the RL agent in optimizing the flight paths while avoiding the obstacles and minimizing the energy consumption.

At step 1414, the method 1400 includes generating, offline by the IPSO 212 on the first processing circuitry 202, the paths for the RL agent to minimize the path length and avoid the static obstacles. This step includes utilizing, by the chaos-based particles, the logistic map 222 to obtain the UAV initialization formation. This step also includes adjusting the mutation rate based on the particles' fitness values to balance the exploitation and the exploration of the search space. This step further includes replacing the inactive particles with the fresh particles, such that the RL-based planner 214 converges towards the global optimum rather than getting stuck in the local optimum.

At step 1416, the method 1400 includes establishing the RL-based planner 214, which is responsible for enabling the RL agent to make adaptive and intelligent navigation decisions while the UAV 102 is flying. The RL-based planner 214, such as the Q-learning model or the DRL model, can be initialized using predefined parameters, including the learning rate, the discount factor, and the exploration-exploitation strategies. The RL-based planner 214 utilizes the particular path generated by the IPSO 212 as the consistent reference, ensuring that the RL agent follows the optimized trajectory while being capable of responding to the dynamic environmental changes.

At step 1418, the method 1400 includes generating actions using the RL-based planner 214 to enable the RL agent to navigate towards the destination. Based on real-time environmental conditions and sensor inputs, the RL-based planner 214 evaluates the current state of the RL agent and selects an optimal action such as adjusting its velocity, changing direction, or altering altitude to avoid obstacles and progress along the path. The selected action is executed, and the UAV's new state is updated accordingly. This process is iteratively repeated, allowing the UAV 102 to learn and refine its path-planning strategy over time while maintaining efficiency and safety in navigation.

At step 1420, the method 1400 includes determining if the UAV 102 has reached the goal. This step includes evaluating whether the UAV's current position matches predefined goal coordinates. This step further includes checking a distance between the UAV's current position and the goal. In an embodiment, if the distance between the UAV's current position and the goal falls below a predefined distance, then the UAV 102 is considered to have reached the goal and the method 1400 proceeds to step 1422. Otherwise, the method 1400 proceeds to step 1424.

At step 1422, the method 1400 includes awarding the positive reward, reinforcing the preference for following the IPSO path. The positive reward incentivizes the UAV 102 to prioritize the optimized path in future learning iterations, improving efficiency and stability in navigation.

At step 1424, the method 1400 includes determining if the UAV 102 goes outside a boundary. This step includes checking whether the UAV's current position exceeds predefined operational limits of the environment. This step includes comparing UAV's coordinates with minimum and maximum allowable values along each axis (e.g., latitude, longitude, and altitude). If any of the UAV's coordinates fall outside the allowable values, then the UAV 102 is considered to have exited the boundary and the method 1400 proceeds to step 1426. Otherwise, the method 1400 proceeds to step 1428.

At step 1426, the method 1400 includes incurring the negative reward as a penalty. This discourages boundary violations or collisions with the obstacles by reducing UAV's cumulative reward.

At step 1428, the method 1400 includes determining if the UAV 102 collides with any obstacles. This step includes checking whether the UAV's current position overlaps with coordinates of any static obstacles or dynamic obstacles in the environment. This step includes continuously monitoring the UAV's trajectory and comparing the UAV's trajectory with the positions of the obstacles at each time step. If the UAV's position matches or falls within the coordinates of any static obstacles or dynamic obstacles, then the collision is detected and the method 1400 proceeds to step 1426. Otherwise, the method 1400 proceeds to step 1430.

At step 1430, the method 1400 includes determining if the UAV 102 reaches one of the locations on the IPSO path. This step includes continuously evaluating the UAV's current position corresponding to predefined waypoints generated by the IPSO 212. This involves calculating a Euclidean distance or another proximity metric between the UAV's current position and a nearest IPSO waypoint. If the UAV 102 reaches the IPSO waypoint or moves within a predefined threshold distance from the destination, it is considered to be following the IPSO path and the method 1400 proceeds to step 1434. Otherwise, the method 1400 proceeds to step 1432.

At step 1432, the method 1400 includes determining if the UAV 102 reaches the free cell that is not part of the IPSO guidance. This step includes evaluating the UAV's current position relative to the IPSO path. This involves checking whether the UAV's coordinates correspond to a navigable but unplanned area that is not designated as the IPSO path. The free cell refers to an obstacle-free region where the UAV 102 can move without collision but lacks the direct influence of the IPSO guidance. The method 1400 proceeds to step 1434 when the UAV 102 reaches the free cell that is not part of the IPSO guidance.

At step 1434, the method 1400 includes calculating the energy required by the UAV 102 to reach the destination. This step further includes adding an additional amount of reward depending on the required energy.

At step 1436, the method 1400 includes awarding the positive reward as the UAV 102 follows the IPSO path and more rewards for being near the destination. This reinforces the UAVs 102 to follow the IPSO guidance.

At step 1438, the method 1400 includes assigning the negative reward. This discourages deviation from the reference path. Also, the small negative reward is subjected to change depending on the distance from that point to the goal.

The first embodiment is illustrated with respect to FIG. 2A. The first embodiment discloses the path planning system 200 for an unmanned aerial vehicle in a network of unmanned aerial vehicles 102. The system 200 includes a plurality of the unmanned aerial vehicles (UAVs) 102. The system 200 further includes a first processing circuitry 202 configured with the PSO component 210 configured to offline generate paths for each of the UAVs 102 by particle swarm optimization (PSO) 212 to minimize path length and avoid static obstacles. The system 200 further includes a second processing circuitry 204 configured with, for each UAV 102, a deep reinforcement learning (RL)-based planner component 216 configured to perform real-time path planning to navigate the UAV 102 through dynamic environmental conditions using a particular path generated by the PSO 212 for the UAV 102 as a consistent reference for the UAV 102. The system 200 further includes a reward component 206 to calculate a reward as part of the path planning by the deep RL-based planner component 216 to determine potential paths and converging to an optimal path for the UAV 102.

In an aspect, the reward component 206 is configured to use the path generated by the PSO 212 for guidance in calculating the reward.

In an aspect, the reward component 206, is further configured to award a positive reward for following the PSO path, making this path preferable to others. The reward component 206 is further configured to incur a negative reward as a penalty, when the UAV 102 potentially collides with any obstacles or goes outside a boundary. The reward component 206 is further configured to award a positive reward as the UAV 102 follows the PSO path and gets closer to a destination.

In an aspect, the reward component 206 is configured to assign a small negative reward when the UAV 102 reaches a free cell that is not part of the PSO 212.

In an aspect, the system 200 includes an energy model 208 configured to calculate energy required by the UAV 102 to reach a destination, and add an additional amount of reward depending on the required energy.

In an aspect, each UAV 102 includes the second processing circuitry 204 and the RL-based planner 214 of the second processing circuitry 204 is an actor-critic reinforcement learning model.

In an aspect, each UAV 102 includes the second processing circuitry 204 and the RL-based planner 214 of the second processing circuitry 204 is a Q-learning model.

In an aspect, the PSO 212 is configured with an initialization stage in which chaos-based particles utilize a logistic map 222 to obtain an initialization formation.

In an aspect, the PSO 212 is configured to adjust a mutation rate based on a particles' fitness values to balance exploitation and exploration of searching space.

In an aspect, the PSO 212 is configured to replace inactive particles with fresh particles, such that the RL-based planner 214 converges towards a global optimum rather than getting stuck in a local optimum.

The second embodiment is illustrated with respect to FIG. 14. The second embodiment discloses the path planning method 1400 for a plurality of unmanned aerial vehicles (UAVs) 102. The method 1400 includes generating, offline by particle swarm optimization (PSO) 212 on first processing circuitry 202, paths for each of the UAVs 102 to minimize path length and avoid static obstacles. The method 1400 further includes for each of the plurality of UAVs 102, performing, by a deep reinforcement learning (RL)-based planner component 216 on second processing circuitry 204, real-time path planning to navigate the UAV 102 through dynamic environmental conditions using a particular path generated by the PSO 212 for the UAV 102 as a consistent reference for the UAV 102. The method 1400 further includes calculating a reward to determine potential paths and converging to an optimal path for the UAV 102 in the deep RL-based planner component 216.

In an aspect, the method 1400 includes calculating the reward using the path generated by the PSO 212 for guidance.

In an aspect, the method 1400 includes awarding a positive reward for following the PSO path, making this path preferable to others. The method 1400 includes incurring a negative reward as a penalty, when the UAV 102 potentially collides with any obstacles or goes outside a boundary. The method 1400 further includes awarding a positive reward as the UAV 102 follows the PSO path and gets closer to a destination.

In an aspect, the method 1400 includes assigning a negative reward when the UAV 102 reaches a free cell that is not part of the PSO 212.

In an aspect, the method 1400 includes calculating energy required by the UAV 102 to reach a destination. The method 1400 includes adding an additional amount of reward depending on the required energy.

In an aspect, the method 1400 includes utilizing, by chaos-based particles, a logistic map 222 to obtain an initialization UAV formation.

In an aspect, the method 1400 includes adjusting a mutation rate based on a particles' fitness values to balance exploitation and exploration of searching space.

In an aspect, the method 1400 includes replacing inactive particles with fresh particles, such that the RL-based planner 214 converges towards a global optimum rather than getting stuck in a local optimum.

The third embodiment is illustrated with respect to FIG. 2A-FIG. 14. The third embodiment discloses a non-transitory computer-readable storage medium including computer executable instructions, wherein the instructions, when executed by a computer, cause the computer to perform a method 1400 for path planning for a plurality of unmanned aerial vehicles (UAV) 102. The method 1400 includes generating, offline by particle swarm optimization (PSO) 212, paths for each of the UAVs 102 to minimize path length and avoid static obstacles. The method 1400 further includes for each of the plurality of UAVs 102, performing, by a deep reinforcement learning (RL)-based planner component 216, real-time path planning to navigate the UAV 102 through dynamic environmental conditions using a particular path generated by the PSO 212 for the UAV 102 as a consistent reference for the UAV 102. The method 1400 further includes calculating a reward to determine potential paths and converging to an optimal path for the UAV 102 in the deep RL-based planner component 216.

In an aspect, the method 1400 includes calculating the reward using the path generated by the PSO 212 for guidance.

Figure 15:
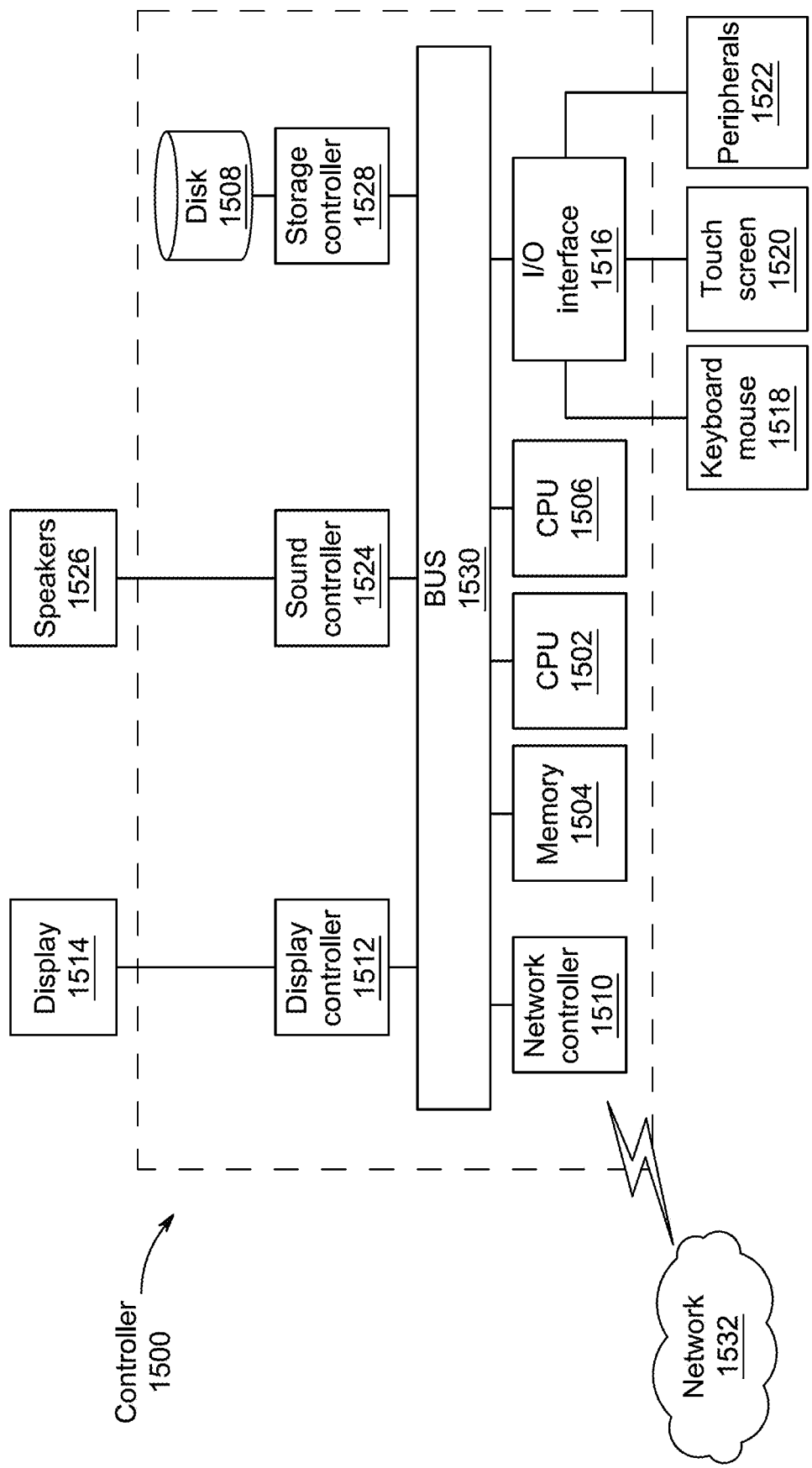
FIG. 15 is an illustration of a non-limiting example of details of computing hardware used in a computing system, according to certain embodiments.

Next, further details of the hardware description of a computing environment according to exemplary embodiments are described with reference to FIG. 15. In FIG. 15, a controller 1500 is described as representative of the processing circuitry 202, 204 of the path planning system 200 of FIG. 2A in which the controller 1500 is the processing circuitry 202, 204 which includes a CPU 1502 which performs the processes described above/below. The process data and instructions may be stored in memory 1504. These processes and instructions may also be stored on a storage medium disk 1508 such as a hard drive (HDD) or portable storage medium or may be stored remotely.

Further, the disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the disclosure may be provided as a utility application, background daemon, or component of an operating system, or combination thereof, executing in conjunction with CPU 1502, 1506 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 1502 or CPU 1506 may be a Xenon or Core processor from Intel of America or an Opteron processor from AMD of America, or may be other processor types that would be recognized by one of ordinary skill in the art. Alternatively, the CPU 1502, 1506 may be implemented on an FPGA, ASIC, PLD or using discrete logic circuits, as one of ordinary skill in the art would recognize. Further, CPU 1502, 1506 may be implemented as multiple processors cooperatively working in parallel to perform the instructions of the inventive processes described above.

The computing device in FIG. 15 also includes a network controller 1510, such as an Intel Ethernet PRO network interface card from Intel Corporation of America, for interfacing with network 1532. As can be appreciated, the network 1532 can be a public network, such as the Internet, or a private network such as an LAN or WAN network, or any combination thereof and can also include PSTN or ISDN sub-networks. The network 1532 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 1512, such as a NVIDIA GeForce GTX or Quadro graphics adaptor from NVIDIA Corporation of America for interfacing with display 1514, such as a Hewlett Packard HPL2445w LCD monitor. A general purpose I/O interface 1516 interfaces with a keyboard and/or mouse 1518 as well as a touch screen panel 1520 on or separate from display 1514. General purpose I/O interface also connects to a variety of peripherals 1514 including printers and scanners, such as an OfficeJet or DeskJet from Hewlett Packard.

A sound controller 1524 is also provided in the computing device such as Sound Blaster X-Fi Titanium from Creative, to interface with speakers/microphone 1526 thereby providing sounds and/or music.

The general purpose storage controller 1528 connects the storage medium disk 1508 with communication bus 1530, which may be an ISA, EISA, VESA, PCI, or similar, for interconnecting all of the components of the computing device. A description of the general features and functionality of the display 1514, keyboard and/or mouse 1518, as well as the display controller 1512, storage controller 1528, network controller 1510, sound controller 1524, and general purpose I/O interface 1516 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 16.

Figure 16:
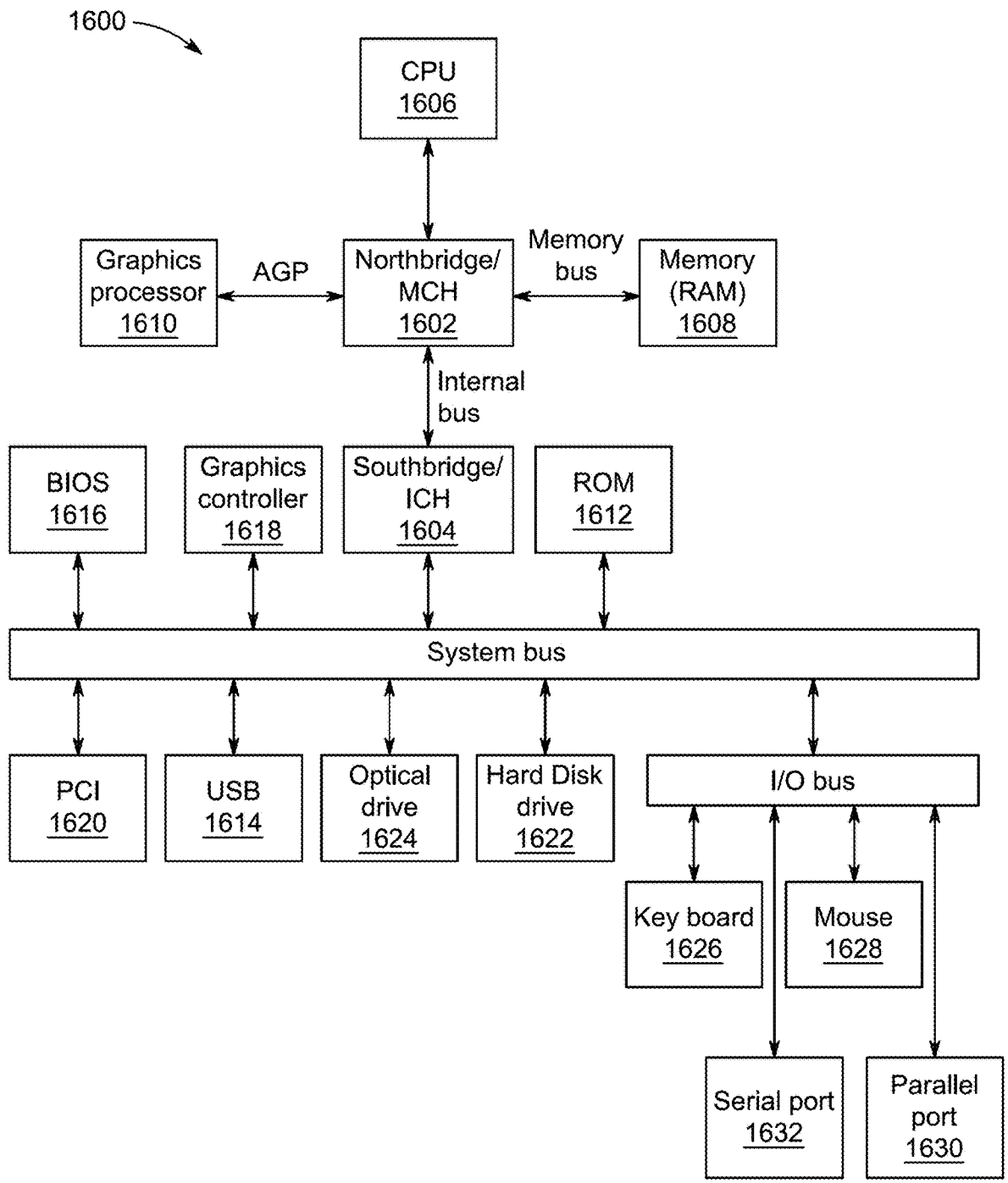
FIG. 16 is an exemplary schematic diagram of a data processing system used within the computing system, according to certain embodiment.

FIG. 16 shows a schematic diagram of a data processing system 1600, according to certain embodiments, for performing the functions of the exemplary embodiments. The data processing system 1600 is an example of a computer in which code or instructions implementing the processes of the illustrative embodiments may be located.

In FIG. 16, data processing system 1600 employs a hub architecture including a north bridge and memory controller hub (NB/MCH) 1602 and a south bridge and input/output (I/O) controller hub (SB/ICH) 1604. The central processing unit (CPU) 1606 is connected to NB/MCH 1602. The NB/MCH 1602 also connects to the memory 1608 via a memory bus, and connects to the graphics processor 1610 via an accelerated graphics port (AGP). The NB/MCH 1602 also connects to the SB/ICH 1604 via an internal bus (e.g., a unified media interface or a direct media interface). The CPU Processing unit 1606 may contain one or more processors and even may be implemented using one or more heterogeneous processor systems.

Figure 17:
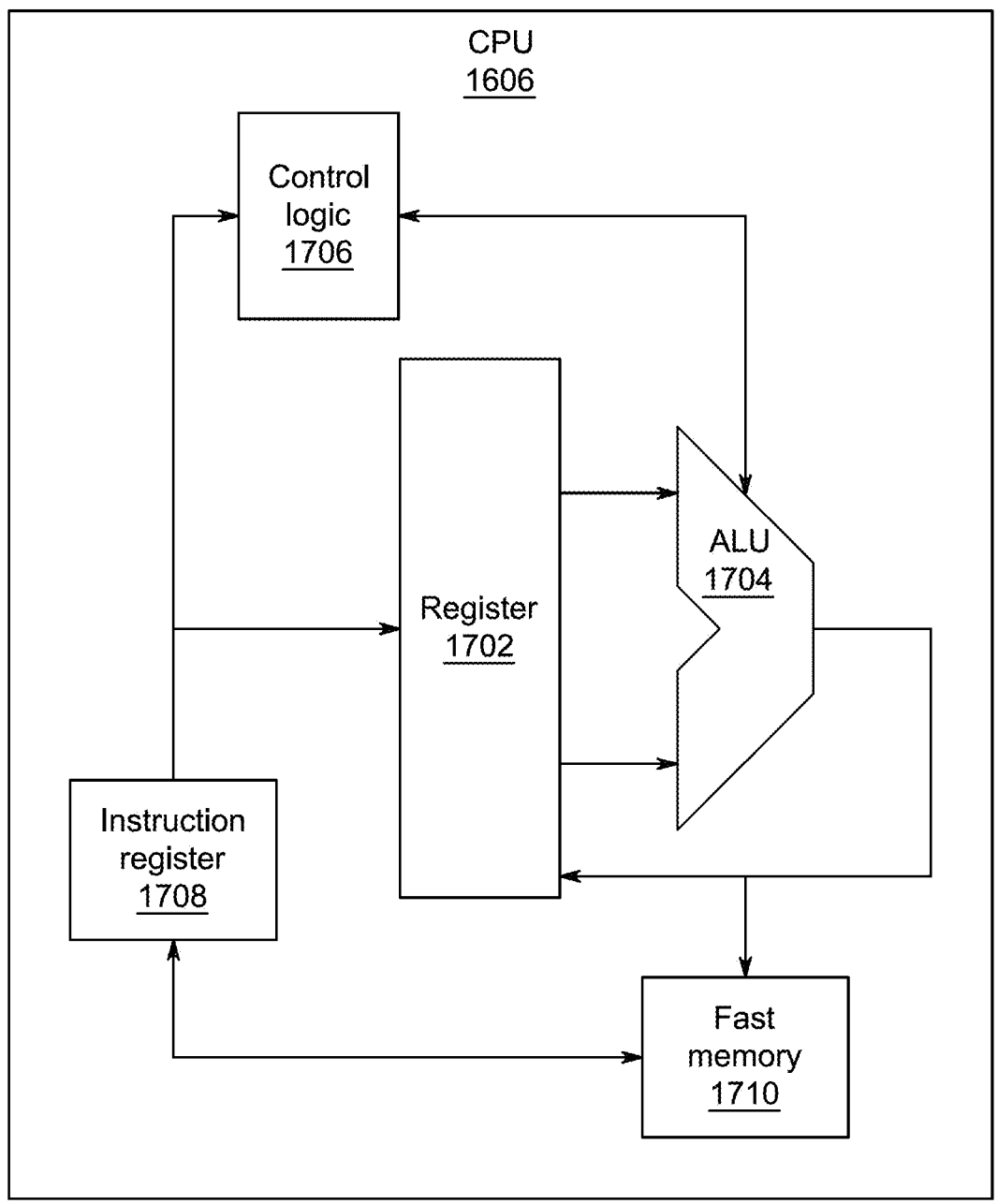
FIG. 17 is an exemplary schematic diagram of a processor used with the computing system, according to certain embodiments.

For example, FIG. 17 shows one implementation of CPU 1606. In one implementation, the instruction register 1708 retrieves instructions from the fast memory 1710. At least part of these instructions is fetched from the instruction register 1708 by the control logic 1706 and interpreted according to the instruction set architecture of the CPU 1606. Part of the instructions can also be directed to the register 1702. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1704 that loads values from the register 1702 and performs logical and mathematical operations on the loaded values according to the instructions. The results from these operations can be feedback into the register and/or stored in the fast memory 1710. According to certain implementations, the instruction set architecture of the CPU 1606 can use a reduced instruction set architecture, a complex instruction set architecture, a vector processor architecture, a very large instruction word architecture. Furthermore, the CPU 1606 can be based on the Von Neuman model or the Harvard model. The CPU 1606 can be a digital signal processor, an FPGA, an ASIC, a PLA, a PLD, or a CPLD. Further, the CPU 1606 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 16, the data processing system 1600 can include that the SB/ICH 1604 is coupled through a system bus to an I/O Bus, a read only memory (ROM) 1612, universal serial bus (USB) port 1614, a flash binary input/output system (BIOS) 1616, and a graphics controller 1618. PCI/PCIe devices can also be coupled to SB/ICH 1604 through a PCI bus 1620.

The PCI devices may include, for example, Ethernet adapters, add-in cards, and PC cards for notebook computers. The Hard disk drive 1622 and optical drive 1624 can use, for example, an integrated drive electronics (IDE) or serial advanced technology attachment (SATA) interface. In one implementation the I/O bus can include a super I/O (SIO) device.

Further, the hard disk drive (HDD) 1622 and optical drive 1624 can also be coupled to the SB/ICH 1604 through a system bus. In one implementation, a keyboard 1626, a mouse 1628, a parallel port 1630, and a serial port 1632 can be connected to the system bus through the I/O bus. Other peripherals and devices that can be connected to the SB/ICH

1604 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 18:
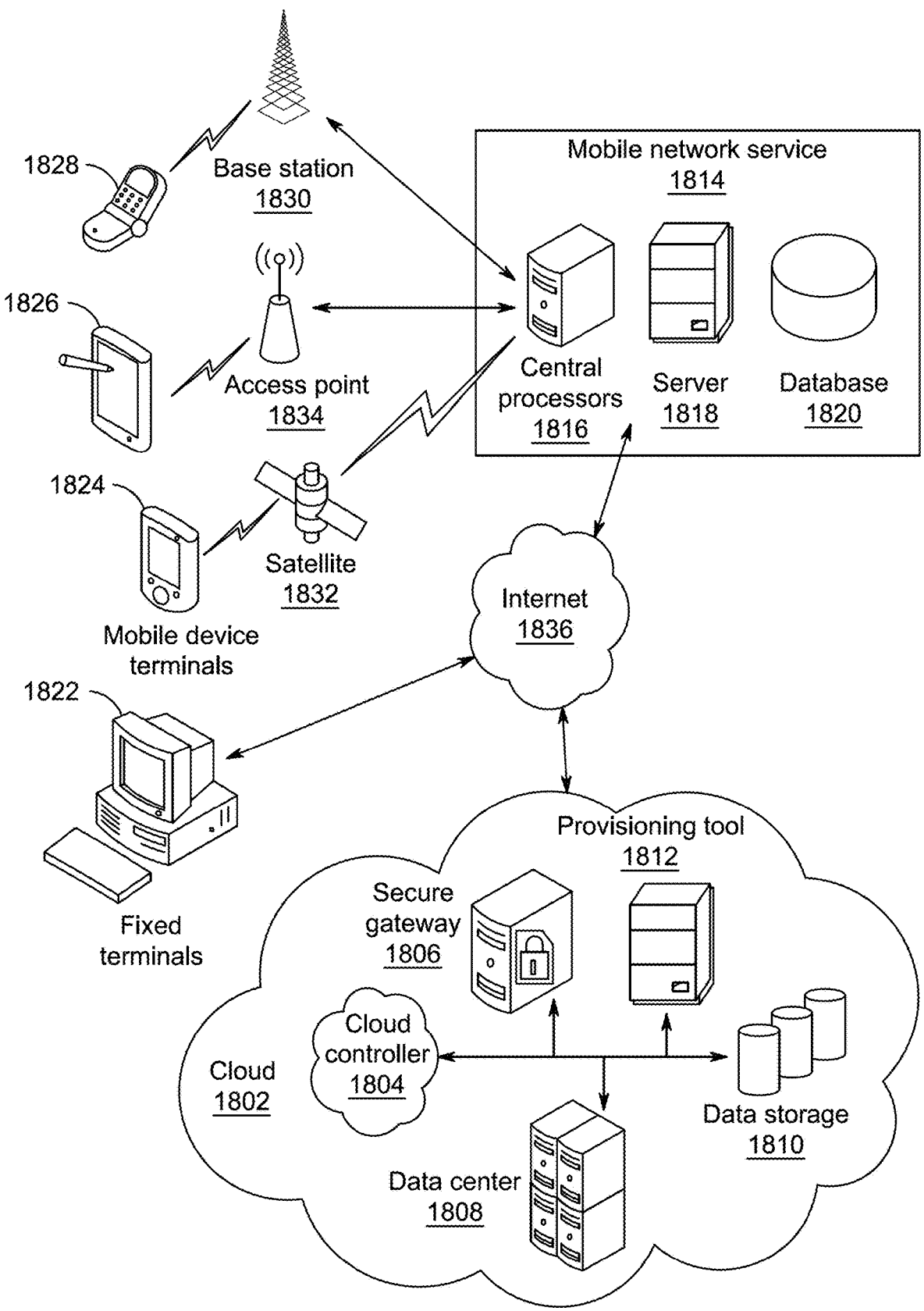
FIG. 18 is an illustration of a non-limiting example of distributed components which may share processing with a controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 1802 including a cloud controller 1804, a secure gateway 1806, a data center 1808, data storage 1810 and a provisioning tool 1812, and mobile network services 1814 including central processors 1816, a server 1818 and a database 1820, which may share processing, as shown by FIG. 18, in addition to various human interface and communication devices (e.g., display monitors 1822, smart phones 1828, tablets 1826, personal digital assistants (PDAs) 1824). The network may be a private network, such as a LAN, satellite 1832 or WAN 1834, or be a public network 1830, may such as the Internet 1836. Input to the system may be received via direct user input and received remotely either in real-time or as a batch process. Additionally, some implementations may be performed on modules or hardware not identical to those described. Accordingly, other implementations are within the scope of the disclosure.

The above-described hardware description is a non-limiting example of corresponding structure for performing the functionality described herein.

Numerous modifications and variations of the present disclosure are possible in light of the above teachings. It is therefore to be understood that within the scope of the disclosure, the invention may be practiced otherwise than as specifically described herein.

The invention claimed is:

1. A path planning system for an unmanned aerial vehicle in a network of unmanned aerial vehicles, comprising:
 a plurality of the unmanned aerial vehicles (UAVs);
 a first processing circuitry configured with
  a particle swarm optimization component configured to offline generate paths for each of the UAVs by particle swarm optimization (PSO) to minimize path length and avoid static obstacles; and
 a second processing circuitry configured with, for each UAV of the plurality of UAVs,
  a deep reinforcement learning (RL)-based planner component configured to perform real-time path planning to navigate the UAV through dynamic environmental conditions using a particular path generated by the PSO for the UAV as a consistent reference for the UAV, and
  a reward component to calculate a reward as part of the path planning by the deep RL-based planner component to determine potential paths and converging to an optimal path for the UAV,
 wherein the PSO is configured with an initialization stage in which chaos-based particles utilize a logistic map to obtain an initialization formation, and
 wherein the PSO is configured to replace inactive particles with fresh particles, such that the RL-based planner converges towards a global optimum rather than getting stuck in a local optimum.

2. The system of claim 1, wherein the reward component is configured to use the path generated by the PSO for guidance in calculating the reward.

3. The system of claim 2, wherein the reward component, is further configured to
 award a positive reward for following the PSO path, making this path preferable to others,
 incur a negative reward as a penalty, when the UAV potentially collides with any obstacles or goes outside a boundary, and
 award a positive reward as the UAV follows the PSO path and gets closer to a destination.

4. The system of claim 1, wherein the reward component is configured to assign a negative reward when the UAV reaches a free cell that is not part of the PSO.

5. The system of claim 1, further comprising an energy model configured to
 calculate energy required by the UAV to reach a destination, and
 add an additional amount of reward depending on the required energy.

6. The system of claim 1, wherein each UAV includes the second processing circuitry and the RL-based planner of the second processing circuitry is an actor-critic reinforcement learning model.

7. The system of claim 1, wherein each UAV includes the second processing circuitry and the RL-based planner of the second processing circuitry is a Q-learning model.

8. The system of claim 1, wherein the PSO is configured to adjust a mutation rate based on a particles' fitness values to balance exploitation and exploration of searching space.

9. A path planning method for a plurality of unmanned aerial vehicles (UAVs), the method comprising:
 generating, offline by particle swarm optimization (PSO) on first processing circuitry, paths for each of the UAVs to minimize path length and avoid static obstacles;
 for each of the plurality of UAVs,
  performing, by a deep reinforcement learning (RL)-based planner component on second processing circuitry, real-time path planning to navigate the UAV through dynamic environmental conditions using a particular path generated by the PSO for the UAV as a consistent reference for the UAV; and
  calculating a reward to determine potential paths and converging to an optimal path for the UAV in the deep RL-based planner component,
 the method further comprising
 utilizing, by chaos-based particles, a logistic map to obtain an initialization UAV formation, and
 replacing inactive particles with fresh particles, such that the RL-based planner converges towards a global optimum rather than getting stuck in a local optimum.

10. The method of claim 9, further comprising calculating the reward using the path generated by the PSO for guidance.

11. The method of claim 10, further comprising:
 awarding a positive reward for following the PSO path, making this path preferable to others;
 incurring a negative reward as a penalty, when the UAV potentially collides with any obstacles or goes outside a boundary; and
 awarding a positive reward as the UAV follows the PSO path and gets closer to a destination.

12. The method of claim 9, further comprising assigning a negative reward when the UAV reaches a free cell that is not part of the PSO.

13. The method of claim 9, further comprising:
   calculating energy required by the UAV to reach a destination; and
   adding an additional amount of reward depending on the required energy.

14. The method of claim 9, further comprising adjusting a mutation rate based on a particles' fitness values to balance exploitation and exploration of searching space.

15. A non-transitory computer-readable storage medium including computer executable instructions, wherein the instructions, when executed by a computer, cause the computer to perform a method for path planning for a plurality of unmanned aerial vehicles (UAV), the method comprising:
   generating, offline by particle swarm optimization (PSO), paths for each of the UAVs to minimize path length and avoid static obstacles;
   for each of the plurality of UAVs,
   performing, by a deep reinforcement learning (RL)-based planner component, real-time path planning to navigate the UAV through dynamic environmental conditions using a particular path generated by the PSO for the UAV as a consistent reference for the UAV; and
   calculating a reward to determine potential paths and converging to an optimal path for the UAV in the deep RL-based planner component,
   the method further comprising
   utilizing, by chaos-based particles, a logistic map to obtain an initialization UAV formation, and
   replacing inactive particles with fresh particles, such that the RL-based planner converges towards a global optimum rather than getting stuck in a local optimum.

16. The computer-readable storage medium of claim 15, further comprising calculating the reward using the path generated by the PSO for guidance.

* * * * *